United States Patent
Gold et al.

(10) Patent No.: US 9,818,173 B2
(45) Date of Patent: Nov. 14, 2017

(54) DISPLAYING REPRESENTATIVE IMAGES IN A VISUAL MAPPING SYSTEM

(71) Applicant: A9.com, Inc., Palo Alto, CA (US)

(72) Inventors: Jonathan A. Gold, Palo Alto, CA (US); Timothy Caro-Bruce, Palo Alto, CA (US); Huy T. Ha, Oakland, CA (US); John Alan Hjelmstad, Palo Alto, CA (US); Christopher Aaron Volkert, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/282,849

(22) Filed: Sep. 30, 2016

(65) Prior Publication Data

US 2017/0024853 A1   Jan. 26, 2017

Related U.S. Application Data

(60) Continuation of application No. 14/873,088, filed on Oct. 1, 2015, now Pat. No. 9,710,866, which is a
(Continued)

(51) Int. Cl.
*G01C 21/00* (2006.01)
*G06T 3/40* (2006.01)
(Continued)

(52) U.S. Cl.
CPC ............ *G06T 3/4038* (2013.01); *G01C 21/26* (2013.01); *G01C 21/367* (2013.01); *G01C 21/3673* (2013.01); *G06F 3/0481* (2013.01); *G06F 3/0482* (2013.01); *G06F 3/0485* (2013.01); *G06F 3/04812* (2013.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS 5,559,707 A   9/1996   DeLorme et al.
5,602,564 A   2/1997   Iwamura et al.
(Continued)

FOREIGN PATENT DOCUMENTS

CA   2559726   10/2005
GB   2427293   10/2008
(Continued)

OTHER PUBLICATIONS

USPTO Non-Final Office Action dated Jul. 23, 2014, U.S. Appl. No. 14/065,328.
(Continued)

*Primary Examiner* — Jonathan M Dager
(74) *Attorney, Agent, or Firm* — Hogan Lovells US LLP

(57) ABSTRACT

Embodiments provide systems and methods for generating a street map that includes a position identifier that identifies a location on the street map. The method and system may also generate and display a plurality of images representative of the location of the position identifier. A user may interact with a position identifier or one of several scroll icons to view images of other locations on the street map and/or to obtain driving directions between two locations.

20 Claims, 26 Drawing Sheets

Related U.S. Application Data continuation of application No. 14/102,128, filed on Dec. 10, 2013, now Pat. No. 9,182,895, which is a continuation of application No. 12/551,405, filed on Aug. 31, 2009, now Pat. No. 8,606,493, which is a continuation of application No. 12/536,407, filed on Aug. 5, 2009, now Pat. No. 8,543,323, which is a division of application No. 11/396,369, filed on Mar. 31, 2006, now Pat. No. 7,587,276, which is a continuation-in-part of application No. 11/045,007, filed on Jan. 26, 2005, now Pat. No. 7,359,797, which is a continuation-in-part of application No. 10/809,049, filed on Mar. 24, 2004, now Pat. No. 7,155,336.

(51) Int. Cl.
| | |
|---|---|
| *G06F 3/0484* | (2013.01) |
| *G06F 3/0481* | (2013.01) |
| *G01C 21/26* | (2006.01) |
| *G06F 17/30* | (2006.01) |
| *G09B 29/12* | (2006.01) |
| *G06Q 30/02* | (2012.01) |
| *G06T 3/00* | (2006.01) |
| *G01C 21/36* | (2006.01) |
| *G06F 3/0482* | (2013.01) |
| *G06F 3/0485* | (2013.01) |

(52) U.S. Cl.
CPC ...... *G06F 3/04845* (2013.01); *G06F 3/04847* (2013.01); *G06F 17/3087* (2013.01); *G06Q 30/0256* (2013.01); *G06T 3/0018* (2013.01); *G06T 3/40* (2013.01); *G09B 29/12* (2013.01); *G06F 2203/04806* (2013.01); *G06T 2200/24* (2013.01)

(56) References Cited

U.S. PATENT DOCUMENTS

| | | | | |
|---|---|---|---|---|
| 5,874,905 A | * | 2/1999 | Nanba | G01C 21/3635 340/988 |
| 5,913,078 A | | 6/1999 | Kimura | |
| 5,987,136 A | | 11/1999 | Schipper et al. | |
| 6,035,253 A | * | 3/2000 | Hayashi | G01C 21/36 340/995.19 |
| 6,097,393 A | * | 8/2000 | Prouty, IV | G06F 3/04815 345/419 |
| 6,169,552 B1 | | 1/2001 | Endo et al. | |
| 6,182,010 B1 | * | 1/2001 | Berstis | G01C 21/3647 340/995.11 |
| 6,249,742 B1 | | 6/2001 | Friederich et al. | |
| 6,307,573 B1 | | 10/2001 | Barros | |
| 6,324,469 B1 | | 11/2001 | Okude et al. | |
| 6,335,754 B1 | * | 1/2002 | Endo | G01C 11/02 348/36 |
| 6,346,980 B1 | | 2/2002 | Tani | |
| 6,356,840 B2 | | 3/2002 | Kusama | |
| 6,360,168 B1 | | 3/2002 | Shimabara | |
| 6,388,688 B1 | * | 5/2002 | Schileru-Key | G06F 3/04815 715/854 |
| 6,496,776 B1 | | 12/2002 | Blumberg | |
| 6,556,878 B1 | | 4/2003 | Fielding | |
| 6,580,441 B2 | | 6/2003 | Schileru-Key | |
| 6,587,784 B1 | | 7/2003 | Okude et al. | |
| 6,710,774 B1 | | 3/2004 | Kawasaki et al. | |
| 6,711,379 B1 | | 3/2004 | Owa et al. | |
| 6,831,990 B2 | | 12/2004 | Marvel et al. | |
| 6,871,143 B2 | * | 3/2005 | Fujiwara | G01C 21/3638 340/995.24 |
| 6,906,643 B2 | * | 6/2005 | Samadani | G01C 7/00 340/995.1 |
| 6,956,590 B1 | * | 10/2005 | Barton | G01C 21/367 345/671 |
| 6,999,075 B2 | | 2/2006 | Kumagai | |
| 7,007,228 B1 | * | 2/2006 | Carro | G01C 21/26 340/990 |
| 7,039,630 B2 | | 5/2006 | Shimazu | |
| 7,155,336 B2 | | 12/2006 | Dorfman | |
| 7,158,079 B2 | * | 1/2007 | Motoyama | G01S 19/51 340/539.13 |
| 7,170,518 B1 | * | 1/2007 | Millington | G01C 21/367 345/428 |
| 7,222,021 B2 | | 5/2007 | Ootomo et al. | |
| 7,289,138 B2 | | 10/2007 | Foote et al. | |
| 7,298,378 B1 | * | 11/2007 | Hagenbuch | G06F 17/30061 345/589 |
| 7,334,190 B2 | | 2/2008 | Wierowski | |
| 7,359,797 B2 | | 4/2008 | Gold et al. | |
| 7,411,594 B2 | | 8/2008 | Endo et al. | |
| 7,460,953 B2 | | 12/2008 | Herbst et al. | |
| 7,467,356 B2 | | 12/2008 | Gettman et al. | |
| 7,518,636 B2 | * | 4/2009 | Endo | H04N 5/23238 348/208.99 |
| 7,539,572 B2 | * | 5/2009 | Kamikawa | G01C 21/3647 340/995.14 |
| 7,587,276 B2 | | 9/2009 | Gold et al. | |
| 7,827,507 B2 | | 11/2010 | Geise et al. | |
| 7,974,781 B2 | | 7/2011 | Emoto et al. | |
| 7,990,394 B2 | | 8/2011 | Vincent et al. | |
| 8,009,178 B2 | * | 8/2011 | Chen | G06T 3/0062 345/419 |
| 8,154,599 B2 | * | 4/2012 | Aoki | G06K 9/32 345/157 |
| 8,543,323 B1 | | 9/2013 | Gold et al. | |
| 8,606,493 B1 | | 12/2013 | Gold et al. | |
| 9,182,895 B1 | | 11/2015 | Gold et al. | |
| 9,429,435 B2 | * | 8/2016 | Blumenberg | G01C 21/26 |
| 2001/0034661 A1 | * | 10/2001 | Ferreira | G06F 3/04815 705/14.4 |
| 2001/0037305 A1 | * | 11/2001 | Mochizuki | G08G 1/096811 705/52 |
| 2002/0044690 A1 | | 4/2002 | Burgess | |
| 2002/0047895 A1 | * | 4/2002 | Bernardo | G01C 11/02 348/48 |
| 2002/0063705 A1 | | 5/2002 | Moriwaki et al. | |
| 2002/0065691 A1 | | 5/2002 | Twig et al. | |
| 2002/0070981 A1 | * | 6/2002 | Kida | G06F 17/30241 715/833 |
| 2002/0123841 A1 | | 9/2002 | Satoh et al. | |
| 2002/0145620 A1 | * | 10/2002 | Smith | G06F 17/30241 715/712 |
| 2002/0154174 A1 | * | 10/2002 | Redlich | G06F 3/04855 715/833 |
| 2002/0154213 A1 | | 10/2002 | Sibyama et al. | |
| 2002/0163547 A1 | * | 11/2002 | Abramson | G06F 3/0481 715/848 |
| 2003/0007668 A1 | * | 1/2003 | Kotake | G01C 21/26 382/113 |
| 2003/0016228 A1 | * | 1/2003 | Youngblood | G06T 3/4038 345/582 |
| 2003/0018427 A1 | | 1/2003 | Yokota et al. | |
| 2003/0023375 A1 | | 1/2003 | Yoshida | |
| 2003/0036848 A1 | | 2/2003 | Sheha et al. | |
| 2003/0060971 A1 | * | 3/2003 | Millington | G01C 21/20 701/454 |
| 2003/0063133 A1 | * | 4/2003 | Foote | G06F 3/04815 715/850 |
| 2003/0065446 A1 | * | 4/2003 | Ootomo | G01C 15/00 702/5 |
| 2003/0103651 A1 | | 6/2003 | Novak | |
| 2003/0107569 A1 | * | 6/2003 | Endo | G06T 15/205 345/419 |
| 2003/0142115 A1 | * | 7/2003 | Endo | G06T 15/20 345/633 |
| 2003/0176966 A1 | | 9/2003 | Yamashita et al. | |
| 2003/0182052 A1 | * | 9/2003 | DeLorme | G01C 21/26 701/533 |
| 2003/0191578 A1 | | 10/2003 | Paulauskas et al. | |
| 2003/0208315 A1 | | 11/2003 | Mays | |

(56) References Cited

U.S. PATENT DOCUMENTS

| | | | |
|---|---|---|---|
| 2004/0004659 A1* | 1/2004 | Foote | H04N 5/262 348/36 |
| 2004/0005078 A1 | 1/2004 | Tillotson | |
| 2004/0073538 A1 | 4/2004 | Leishman et al. | |
| 2004/0078813 A1* | 4/2004 | Kobuya | G01C 21/20 725/46 |
| 2004/0107072 A1* | 6/2004 | Dietrich | G01C 21/206 702/153 |
| 2004/0119759 A1* | 6/2004 | Barros | G06F 17/30241 715/853 |
| 2004/0128215 A1* | 7/2004 | Florance | G06F 17/30241 705/28 |
| 2004/0138817 A1* | 7/2004 | Zoken | G01C 21/32 702/5 |
| 2004/0150534 A1 | 8/2004 | Linn | |
| 2004/0174386 A1* | 9/2004 | Kotake | G06T 15/205 345/633 |
| 2004/0215390 A1 | 10/2004 | Nomura | |
| 2004/0249565 A1* | 12/2004 | Park | G01C 21/36 701/410 |
| 2005/0086612 A1* | 4/2005 | Gettman | G06F 3/04815 715/848 |
| 2005/0099494 A1* | 5/2005 | Deng | H04N 1/2112 348/36 |
| 2005/0116964 A1* | 6/2005 | Kotake | G06T 15/205 345/629 |
| 2005/0132305 A1* | 6/2005 | Guichard | G06F 17/30899 715/855 |
| 2005/0192025 A1* | 9/2005 | Kaplan | G06F 17/3087 455/456.1 |
| 2005/0207672 A1 | 9/2005 | Bernardo et al. | |
| 2005/0216186 A1* | 9/2005 | Dorfman | G06F 17/30241 701/408 |
| 2005/0234638 A1* | 10/2005 | Ogaki | G06T 17/05 701/436 |
| 2005/0268254 A1 | 12/2005 | Abramson et al. | |
| 2005/0273252 A1* | 12/2005 | Nix | G01C 21/3632 701/431 |
| 2006/0004512 A1* | 1/2006 | Herbst | G01C 21/3638 701/431 |
| 2006/0031786 A1* | 2/2006 | Hillis | G06F 3/04883 715/863 |
| 2006/0037990 A1* | 2/2006 | Geise | G01C 21/36 228/101 |
| 2006/0089792 A1* | 4/2006 | Manber | G01C 21/3644 701/408 |
| 2006/0174209 A1* | 8/2006 | Barros | G06F 3/0483 715/764 |
| 2006/0178818 A1* | 8/2006 | Dhollande | G01C 21/3632 701/533 |
| 2007/0136259 A1* | 6/2007 | Dorfman | G01C 21/26 |
| 2007/0143676 A1* | 6/2007 | Chen | G01C 22/02 715/700 |
| 2007/0150188 A1* | 6/2007 | Rosenberg | G01C 21/3647 701/431 |
| 2007/0263995 A1* | 11/2007 | Park | G03B 37/02 396/50 |
| 2008/0189130 A1 | 8/2008 | Dorfman et al. | |
| 2008/0195314 A1* | 8/2008 | Green | G01C 21/3635 701/436 |
| 2010/0088017 A1* | 4/2010 | Ujino | G01C 21/20 701/439 |
| 2010/0123737 A1* | 5/2010 | Williamson | G01C 21/3647 345/672 |
| 2014/0365113 A1* | 12/2014 | McGavran | G01C 21/00 701/425 |
| 2016/0026379 A1 | 1/2016 | Gold | |
| 2017/0024853 A1 | 1/2017 | Gold | |

FOREIGN PATENT DOCUMENTS

| | | |
|---|---|---|
| IN | 256317 | 5/2013 |
| JP | 20013566170 | 12/2001 |
| JP | 20090135416 | 6/2009 |
| JP | 201010283998 | 12/2010 |
| WO | 2005/094550 | 10/2005 |

OTHER PUBLICATIONS

USPTO Final Office Action dated Dec. 5, 2014, U.S. Appl. No. 14/065,328.
USPTO Non-Final Office Action dated Apr. 7, 2014, U.S. Appl. No. 14/102,128.
USPTO Non Final Office Action dated Mar. 2, 2015, U.S. Appl. No. 14/102,128.
USPTO Final Office Action dated Oct. 20, 2014, U.S. Appl. No. 14/102,128.
USPTO Notice of Allowance dated Jul. 10, 2015, U.S. Appl. No. 14/102,128.
USPTO Non-Final Office Action dated Nov. 19, 2012, U.S. Appl. No. 12/551,405, 12 pages.
USPTO Final Office Action dated Mar. 27, 2013, U.S. Appl. No. 12/551,405, 13 pages.
USPTO Notice of Allowance dated Aug. 20, 2013, U.S. Appl. No. 12/551,405, 12 pages.
USPTO Non-Final Office Action dated Nov. 28, 2011, U.S. Appl. No. 12/536,407, 13 pages.
USPTO Final Office Action dated Apr. 24, 2012, U.S. Appl. No. 12/536,407, 14 pages.
USPTO Non-Final Office Action dated Oct. 2, 2007, U.S. Appl. No. 11/396,369, 8 pages.
USPTO Non-Final Office Action dated Feb. 12, 2008, U.S. Appl. No. 11/396,369, 9 pages.
USPTO Non-Final Office Action dated Jan. 23, 2009, U.S. Appl. No. 11/396,369, 11 pages.
USPTO Notice of Allowance dated May 4, 2009, U.S. Appl. No. 11/396,369, 4 pages.
USPTO Non-Final Office Action dated Apr. 30, 2007, U.S. Appl. No. 11/045,007, 7 pages.
USPTO Notice of Allowance dated Nov. 26, 2007, U.S. Appl. No. 11/045,007, 6 pages.
USPTO Non-Final Office Action dated Mar. 8, 2006, U.S. Appl. No. 10/809,049, 6 pages.
USPTO Notice of Allowance dated Aug. 23, 2006, U.S. Appl. No. 10/809,049, 6 pages.
USPTO Notice of Allowance dated Jun. 28, 2016, U.S. Appl. No. 14/873,088.
"Office Action dated Oct. 31, 2012" received in Canadian Application No. 2,559,726.
"Office Action dated Jul. 30, 2013" received in Canadian Application No. 2,559,726.
"Notice of Allowance dated Mar. 25, 2015" received in Canadian Application No. 2,559,726.
"Office Action dated Feb. 25, 2011" received in Indian Application No. 2571/KOLNP/2006.
"Office Action dated Dec. 2, 2011" received in Indian Application No. 2571/KOLNP/2006.
"Examination Report dated Jan. 26, 2007" received in Great Britain Application No. 0617456.9.
"Examination Report dated Sep. 18, 2007" received in Great Britain Application No. 0617456.9.
"Examination Report dated Feb. 26, 2008" received in Great Britain Application No. 0617456.9.
"Search and Examination Report dated May 27, 2008" received in Great Britain Application No. 0617456.9.
"Notice of Allowance dated Sep. 16, 2008" received in Great Britain Application No. 0617456.9.

\* cited by examiner

DISPLAYING REPRESENTATIVE IMAGES IN A VISUAL MAPPING SYSTEM

CROSS-REFERENCES TO RELATED APPLICATIONS

This application is a continuation of U.S. patent application Ser. No. 14/873,088, filed Oct. 1, 2015, which is a continuation of U.S. patent application Ser. No. 14/102,128, filed Dec. 10, 2013, which is a continuation of U.S. patent application Ser. No. 12/551,405, filed Aug. 31, 2009, which is a continuation of Ser. No. 12/536,407, filed Aug. 5, 2009, which is a divisional of Ser. No. 11/396,369, filed Mar. 31, 2006, now U.S. Pat. No. 7,587,276, which is a continuation-in-part of U.S. patent application Ser. No. 11/045,007, filed Jan. 26, 2005, now U.S. Pat. No. 7,359,797, which is a continuation-in-part of U.S. patent application Ser. No. 10/809,049, filed Mar. 24, 2004, now U.S. Pat. No. 7,155,336, each of which is hereby incorporated herein by reference.

BACKGROUND

Various online directories and map services, such as online Yellow Pages and MapQuest®, are available for users to locate and find information about businesses and services and directions to those businesses. Typically, when searching an online business directory, a user is prompted to enter selection criteria, such as the general geographic location (e.g., state and city), and the type or category of business (e.g., restaurant) that the user is looking for, or perhaps the name of the business itself, if known. In response, listings for each of the businesses that meet the user's selection criteria are displayed. Each listing typically identifies the name, address, and phone number of the listed business. Further, each listing may be associated with icons that the user may click to obtain further information about the business, such as a map of an area around the business and driving directions to the business.

Current online directories, however, do not provide listings that can be displayed with an image of the physical location of the business featured in the listing. While some aerial or rooftop images are available online in correlation with addresses, such aerial or rooftop views are of limited value because they do not show, for example, business buildings in the manner actually perceived by customers (i.e., at the ground or street level). Additionally, online maps do not provide images of physical surroundings associated with points on a map. More particularly, what is lacking is an automated system and method for collecting and displaying images of objects at geographic locations, such as business storefronts and street views of structures, in online directories and maps.

BRIEF SUMMARY

The present invention provides methods and systems whereby online maps, such as street maps, may be displayed along with images of building and other objects at physical locations represented by those maps. Thus, a user accessing an online map prepared using embodiments of the present invention can visually appreciate the businesses, buildings, streets, and also perhaps areas surrounding a location.

In accordance with one aspect, a computer-readable medium having instructions stored thereon that directs a computing system to display a map and images representative of a location on that map is provided. A position identifier that includes a pair of scroll icons may be displayed on the map to identify a particular location. For that location, a plurality of images may be displayed to illustrate the physical surroundings (e.g., buildings) at the location identified by the position identifier. Those images may be displayed in a dual filmstrip-type view, one on each side of a graphical representation of a street. The orientation of the dual filmstrip-type view may be such that it illustrates the images on either side of a street. Alternatively, the dual filmstrip-type view may provide a montage, panoramic, or any other type view, of objects surrounding the location identified by the position identifier. A set of scroll icons may be positioned at either end of the filmstrip-type views. Those scroll icons may be directionally correlated with the scroll icons displayed on the position identifier and interaction with any of the scroll icons will have an effect on the correlated scroll icons.

In accordance with another aspect, a method for providing directions between a first location and a second location is provided. The method determines a route between the first location and the second location and displays direction details for the route. The displayed direction details include links to an image representative of the locations included or otherwise referenced in the driving directions. A map may also be displayed that graphically emphasis the driving directions.

In accordance with another aspect of the present invention, a computer system having a computer-readable medium including a computer-executable program therein for performing a method for providing information regarding a location is provided. The method performed by the computer system selects a location and displays, on a graphical user interface, a position identifier on a street map at the selected location. A plurality of images associated with the selected location are also displayed on the graphical user interface. The plurality of images may be displayed in a graphical order. For example, they may be arranged such that they are represented on either side of a representation of a street. Alternatively, the images may be images only along one side of the street.

Accordingly, an online map system of the present invention permits the user to visually appreciate not only street maps and images of various locations within the street maps, but also images surrounding those locations. A user may also interact with the scroll icons to obtain new images thereby virtually moving up or down the street.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention includes systems and methods for collecting and displaying images of objects (including, without limitation, buildings, structures, and store fronts) obtained at different geographic locations. The images may be displayed in association with corresponding listings in online directories. The following detailed description provides several exemplary implementations of the invention. Although specific system configurations and flow diagrams are illustrated, it should be understood that the examples provided are not exhaustive and do not limit the invention to the precise forms disclosed. Persons having ordinary skill in the field of digital data processing will recognize that the computer components and arrangements described herein may be interchangeable with other components and arrangements and that the process steps described herein may be interchangeable with other steps or their combinations, and still achieve the benefits and advantages of the present invention.

It should also be noted that while the following description is provided in the context of maps with graphical images of locations included in a map, and an online business directory (e.g., Yellow Pages) at which each business listing is associated with an image of its geographic location, the present invention can be applied to create and publish online residential directories (e.g., White Pages) in which each individual listing is associated with an image of its geographic location (e.g., an image of a house). Therefore, the term "Yellow Pages" as used herein may refer to other types of directories as well, including White Pages.

Figure 1:
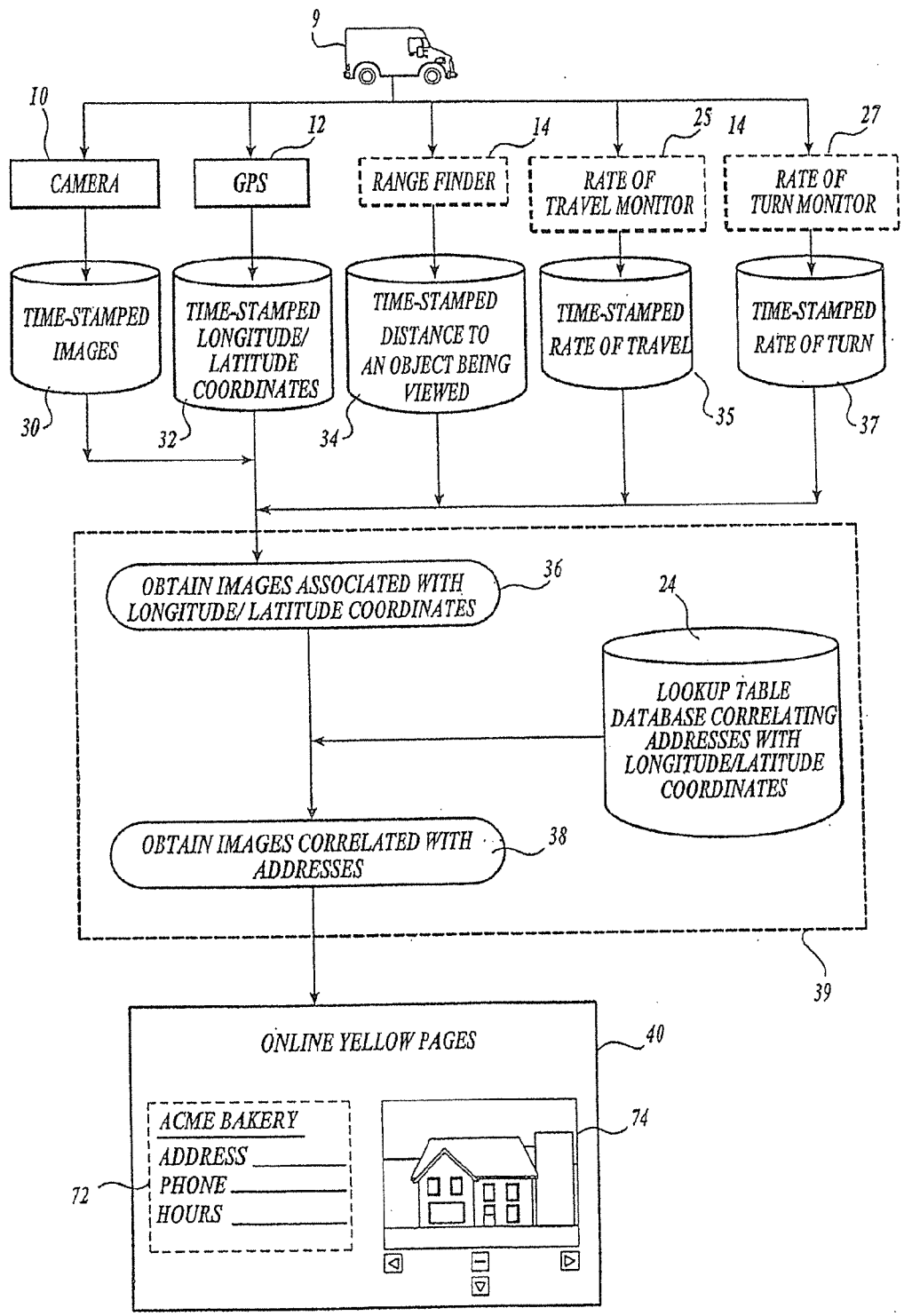
FIG. 1 is a pictorial flow diagram of one exemplary method for collecting address-correlated images of objects at geographic locations for publication in an online directory according to one embodiment of the present invention.

FIG. 1 illustrates an overall flow diagram of a method for collecting images of objects at geographic locations for publication in an online directory, at which each listing is associated with an image taken by a camera at the address in the listing. A system for collecting images (e.g., system 16 in FIG. 2) is mounted on a vehicle 9. The vehicle 9 may be an automobile, as illustrated, but may be of any other type apparent to one skilled in the art, such as a bicycle, bus, or airborne vehicle such as a manned or unmanned airplane. The image collection system, in this embodiment, includes at least one camera 10 and a GPS receiver 12. Optionally, a range finder 14, a rate of travel monitor 25, and a rate of turn monitor 27 may also be included in the system and mounted on the vehicle 9.

Figure 2:
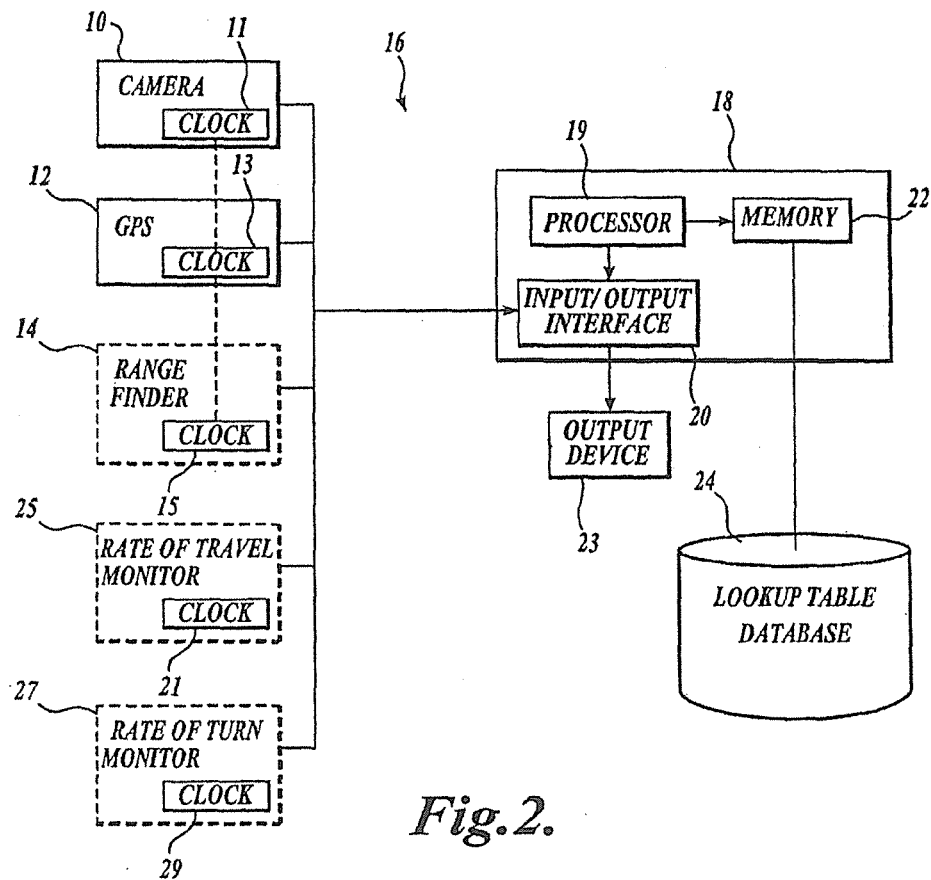
FIG. 2 is a functional block diagram of an exemplary system that may be used to collect images of objects at geographic locations.

FIG. 2 illustrates an embodiment of a system 16 suitable for collecting images of objects at geographic locations and correlating the images with street addresses for the geographic locations. The system 16 includes the camera 10, the GPS receiver 12, and perhaps the range finder 14, rate of travel monitor 25, and rate of turn monitor 27, each including or having access to a synchronized clock 11, 13, 15, 21, and 29, respectively. The clocks 11, 13, 15, 21, and 29 may be separate clocks that are synchronized with each other or, alternatively, a single clock to which the camera 10, the GPS receiver 12, the range finder 14, the rate of travel monitor 25, and the rate of turn monitor 27 are coupled for time reference. A synchronized clock may thus mean one or more clocks from which each of multiple devices can receive synchronized time information. The camera 10, the GPS receiver 12, the range finder 14, and rate of travel monitor 25 and rate of turn monitor 27, if provided, are coupled to a computing device 18, such as a laptop computer. In some applications where the data storage capacity of the camera 10, the GPS receiver 12, the range finder 14, the rate of travel monitor 25, and the rate of turn monitor 27 is sufficiently large, the computing device 18 need not be coupled to the camera 10, the GPS receiver 12, the range finder 14, the rate of travel monitor 25, and the rate of turn monitor 27 during image collection (e.g., while mounted on the vehicle 9).

The computing device 18 includes a processor 19 in communication with an input/output interface 20 and a memory 22. The input/output interface 20 enables the computing device 18 to communicate with various input and output devices. Input devices may include the camera 10, the GPS receiver 12, the range finder 14, the rate of travel monitor 25, and the rate of turn monitor 27, as illustrated, plus any other computing elements that provide input signals to the computing device 18, such as a keyboard, mouse, external memory, disk drive, etc.

Output devices 23 may include typical output devices, such as a computer display, printer, facsimile machine, copy machine, etc. The processor 19 is configured to operate in accordance with computer program instructions stored in a memory, such as the memory 22. Program instructions may also be embodied in a hardware format, such as one or more programmed digital signal processors. The memory 22 may also be configured to store various data (e.g., image data, geographic location data, and speed data) collected and processed, as will be more fully described below. In some applications, the data obtained by the camera 10, the GPS receiver 12, and the range finder 14 (if provided) are sent directly to a hard drive (forming part of the memory 22) of the computing device 18 for storage, instead of being first stored in video tapes or removable disks. The memory 22 may include, for example, a lookup table database 24 that stores address data in correlation with geographic locations (e.g., longitude and latitude coordinates). Suitable lookup table databases are routinely used for the purpose of creating maps and are commercially available. Those having ordinary skill in the art of computers will recognize that a wide selection of commercially available components and arrangements can be used to construct a system, such as the system 16 illustrated in FIG. 2. In particular, the computing device 18 may include additional conventional components, such as a network interface, which are not illustrated herein for the purpose of clarity.

Referring back to FIG. 1, once the camera 10, the GPS receiver 12, and perhaps the range finder 14, rate of travel monitor 25 and/or rate of turn monitor 27 are mounted on the vehicle 9, an operator drives the vehicle while automatically, or perhaps manually (with the aid of another operator), capturing a series of images of objects (e.g., building or store fronts) on each side of the street using the camera 10. In some applications, for example, when the street width is sufficiently narrow or the street is relatively quiet, two cameras 10 may be mounted on the vehicle facing opposite directions so as to simultaneously take two series of images covering both sides of the street. In other applications, three or more cameras 10 may be mounted on the vehicle. For example, two or more cameras 10 may be mounted on the same side of the vehicle (for example, two on one side and two on the other side) to collectively obtain a stereoscopic image of each object being imaged. Any suitable auto-focus camera(s) 10 may be used, as will be apparent to one skilled in the art, though preferably the camera 10 would be a digital still camera or a digital video camera. If a digital still camera is used, the series of images taken will be still images. If a digital video camera is used, the series of images taken will be image frames that collectively form a video image. In any case, the camera 10 preferably time-stamps each image, i.e., records the time each image (or each image frame) is taken, in reference to a synchronized clock 11. Time-stamping is a standard feature of commercially available cameras.

As the camera 10 captures images of objects at geographic locations (e.g., businesses), the GPS receiver 12 records the geographic locations (e.g., longitude and latitude coordinates) while preferably time-stamping the recorded location data. The camera 10 and the GPS receiver 12 may be positioned or programmed relative to each other (e.g., by offsetting the distance therebetween) such that the geographic location determined by the GPS receiver 12 can be treated as that of the camera 10 itself. The rate of travel monitor 25, if used, records the rate of travel of the vehicle 9 as data is being collected while preferably time-stamping such information. As discussed below, the rate of travel information may be used to assist in filtering images or in determining the geographic coordinates of an image. Similarly, the rate of turn monitor 27, if used, records the degree of any turns made by the vehicle 9 as data is being collected while preferably time-stamping such information. For example, the rate of turn monitor 27 may be a gyroscope mounted on the vehicle 9, and the resistance incurred by the gyroscope during a turn may be used to calculate the degree of the turn made. Calculating and recording the degree of a turn may be used in conjunction with the rate of travel information recorded by the rate of travel monitor 25 to determine the geographic coordinates of an image if GPS data is not available.

The range finder 14, if used, records the distance to an object being viewed by the range finder 14 while preferably time-stamping such distance information. The range finder 14 may also be positioned or programmed relative to the camera 10 and the GPS receiver 12 such that the distance information determined by the range finder 14 can be treated as that of the camera 10. Any suitable GPS receiver and range finder may be used, as will be apparent to one skilled in the art. For example, some high-precision GPS receivers suitable for use in the present invention are available from Trimble Navigation Ltd. of Sunnyvale, Calif. (trimble.com). A line of laser range finders suitable for use in the present invention is available from Measurement Devices Ltd. (MDL) of Scotland, U.K. (mdl.co.uk).

Figure 3:
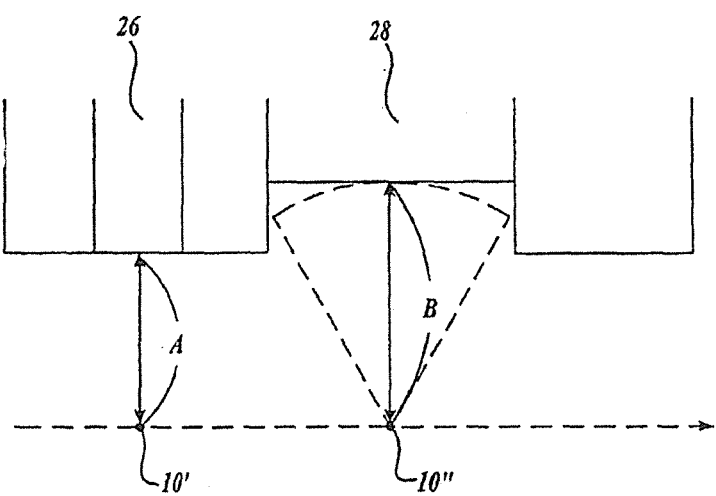
FIG. 3 is a schematic diagram illustrating distance offsetting between a camera and an object being imaged by the camera.

The range finder 14 is useful in offsetting the distance between the GPS receiver 12 (geographically coinciding with the camera 10 and the range finder 14) and the object being imaged by the camera 10, so as to more accurately determine the precise geographic location of the object being imaged. Specifically, referring to FIG. 3, when a camera 10 mounted on a vehicle is moved from position 10' to position 10" with the movement of the vehicle, the distance from the camera to the object being imaged changes from distance A (to building 26) to distance B (to building 28). If the distance from the camera 10 to the objects being imaged by the camera 10 is substantially constant, a standard offset (e.g., distance A) may be used to calculate the longitude/latitude coordinates (i.e., geographic location) of the objects being imaged. If, on the other hand, this distance varies substantially, or if it is preferred to precisely calculate the longitude/latitude coordinates of the objects being imaged, the range finder 14 may be used to continuously measure this distance. The direction of the field of view of the camera 10 may be determined by a compass (not shown) or based on the direction of the movement of the camera 10 carried by the vehicle (e.g., from position 10' to position 10" in FIG. 3) as determined by the GPS receiver 12. An angle of the camera 10 relative to the moving direction of the vehicle is known and may be used to further determine the direction of the camera 10 relative to the objects being imaged.

Sometimes the vehicle 9 must travel on inclines. Since buildings are built perpendicular to the earth, with the camera 10 being mounted level to the vehicle 9, the images captured by the camera 10 appear tilted. To overcome this problem, a gyroscope can be used with the camera 10 mounted on a gimbal. A suitable gyroscope-based mounting system (or a stabilizer) can be obtained from Kenyon Laboratories LLC of Essex, Conn. (ken-lab.com). The gyroscope-based mounting system, in an embodiment of the present invention may use the same gyroscope used to gather data for the rate of turn monitor 27. Alternatively, separate gyroscopes may be used. Another approach for solving the problem of images appearing tilted is to use a digital inclinometer to track an angle of the camera 10 relative to a level, and then rotate the images in software during post-capture processing to compensate for the measured tilt-angles.

To collect images and geographic locations of numerous businesses, many vehicles may be used, each equipped with a camera and a GPS receiver. In order to efficiently collect images and geographic location data of businesses in remote or isolated areas, certain utility vehicles, such as U.S. Postal Service delivery vehicles or taxicabs, may be requested to carry a data collection system of the present invention.

Referring back to FIG. 1, the camera 10 therefore produces a set of time-stamped image data 30, the GPS receiver 12 produces a set of time-stamped geographic location data 32 (e.g., longitude and latitude coordinates), the range finder 14 produces a set of time-stamped distance information data 34, the rate of travel monitor 25 produces a set of time-stamped rate of travel information data 35, and the rate of turn monitor 27 produces a set of time-stamped rate of turn information data 37. These sets of data may be downloaded to the computing device 18 (see FIG. 2) and associated with each other based on their respective time-stamps so as to associate each image with a geographic location of the object featured in the image, as indicated at block 36 in FIG. 1. The data download to the computing device 18 may occur continuously (e.g., at the same time as the data is collected by the camera 10, the GPS receiver 12, the range finder 14, and the rate of travel monitor 25) or in batches (e.g., after a certain volume of data is collected by the camera 10, the GPS receiver 12, the range finder 14, the rate of travel monitor 25, and the rate of turn monitor 27).

Alternative methods of associating image data with geographic locations are encompassed by the invention. For example, instead of relying on synchronization of the clocks 11, 13, 15, and 21 of the respective devices, the devices may be coupled to each other so that, for example, image taking of the camera 10 instantaneously triggers the GPS receiver 12 and the range finder 14 to record the geographic location and the distance information at that location, and the data are recorded together as a unit. Alternatively, geographic location recording of the GPS receiver 12 (or another controller triggered by the geographic location recording of the GPS receiver 12) triggers the camera 10 to take an image. For example, the longitude/latitude coordinates of selected businesses whose images are to be taken (available from the lookup table database 24) may be input to the GPS receiver 12 coupled to the camera 10. Each time the GPS receiver 12 determines it is located in front of a selected business, the GPS receiver 12 records the geographic location and triggers the camera 10 to record an image of the business. In this way, only those images capturing listed business addresses will be taken. The foregoing description is not exhaustive, and other methods for associating images with geographic locations may be used, as will be apparent to one skilled in the art.

While components of the system 16, such as the camera 10, the GPS receiver 12, the range finder 14, the rate of travel monitor 25, and the computing device 18, may be individually configured and assembled as described above, alternative systems may employ various commercially available geographic information systems (GIS) that are typically used for surveying and mapping. Typically, a geographic information system is a combination of elements (including both hardware and software) designed to collect, manipulate, store, and display geographic data. For example, Red Hen Systems, Inc., of Fort Collins, Colo. (redhensystems.com), offers add-on GPS receivers sold under the trademark of VMS 200™ and VMS Mobile™ that can be used with an off-the-shelf digital video camera to embed GPS data on the video recording. Similarly, Measurement Devices Ltd. (MDL) of Scotland, U.K. (mdl.co.uk), offers an add-on GPS module sold under the trademark of VideoAce® that can be combined with any video camera to collect video still images and movies that are referenced with GPS data. Using these devices, one can readily collect a series of images that are referenced with their geographic locations (longitude and latitude coordinates). Note that use of these systems combining the GPS receiver and the camera eliminates the need to synchronize clocks in various components (the camera 10, the GPS receiver 12, etc.).

According to one aspect of the present invention, only a subset of the entire set of obtained images (video image frames, or still images) may be selected and used so as to minimize both gaps and overlaps. For example, when a video camera is set to take 30 frames per second, only frames every X feet (depending on the rate of travel of the video camera) are selected to minimize both frame gaps and frame overlaps. Alternatively, or in addition thereto, every X frame may be selected to further minimize both frame gaps and frame overlaps. Still further, in another embodiment, a subset of images may be obtained by comparing adjacent images and retaining those images that are sufficiently different, based upon a predetermined threshold, from one another.

Sometimes, signals from the GPS satellites may become too weak to permit the GPS receiver 12 to calculate its geographic location. For example, the GPS receiver 12 may not function well when it is placed without a clear view of a wide sky (e.g., in cities with tall buildings, under trees with a thick canopy, etc.). Also, there may be limitations on the logging rate of the GPS receiver 12 (e.g., most GPS receivers currently permit only one geographic location recordation per second). In accordance with the present invention, interpolation of the geographic location information, rate of travel information and rate of turn information, if gathered, is used to overcome the GPS signal loss issues and/or the limitations on the GPS logging rate. Specifically, using any two geographic locations recorded by the GPS with time-stamps ("logged locations"), the rate of travel (if unknown), and also the direction of travel can be calculated. Then, the geographic location (e.g., longitude and latitude coordinates) of any point between the two logged locations can be calculated using interpolation based on the rate of travel and the direction of travel. Additionally, if rate of turn information was gathered, any turns between the two geographic locations recorded by the GPS may be determined. Additionally, the logged locations can be overlaid onto existing maps showing streets, which define feasible regions (routes) of image capture along which the vehicle 9 carrying the camera 10 could have passed. In other words, the streets indicate feasible (valid) paths along which the geographic locations calculated based on interpolation can fall. For example, if a map shows a building, any interpolated geographic location (between two logged locations) that falls "inside" the building is invalid as showing the possible location of the camera 10 because the vehicle 9 carrying the camera 10 could not have driven "through" the building. Therefore, by overlaying the logged locations to existing maps of streets, which provide feasible regions to verify the validity of any geographic location calculated based on interpolation, one can reduce or eliminate interpolation errors. Accordingly, using the interpolation method, perhaps as assisted by the map-overlaying method, a geographic location of any image can be calculated even when such a geographic location cannot be directly obtained using the GPS receiver 12.

In some cases, it is preferable to use a GPS receiver having a relatively higher refresh rate so as to reduce the need for interpolation. For example, while most commercially available GPS receivers currently permit only one geographic location recordation per second, a GPS receiver and its associated software may be configured to obtain more than one geographic location recordation per second.

Next, as indicated in block 38 of FIG. 1, the computing device 18 correlates each image (already associated with a geographic location) with an address by referring to a lookup table database 24 that stores addresses in correlation with their longitude and latitude coordinates. Alternatively, a suitable algorithm for deriving an address based on a geographic location (e.g., longitude and latitude coordinates) may be used, such as the algorithm supported by "Geocoding Server" available from MapQuest™. Such an algorithm uses a series of logics to estimate an address based on longitude/latitude coordinates, such as a block numbering system, a position within a sequence of addresses on a block (e.g., 1002 is the second of 10 addresses on a block so it is likely to be at 20% of the block distance from the corner), and the odd/even numbering system to indicate a particular side of each street. Based on the estimated location of an address derived from an algorithm, images having coordinates near the estimated location may be correlated with that address. In addition, as discussed in more detail below with respect to FIGS. 5 and 14, a boundary surrounding the estimated location of each address may be defined and images within that boundary may be correlated with that address. Further details regarding the process 39 (comprising steps 36 and 38 of FIG. 1) for manipulating data collected by the camera 10, the GPS receiver 12, and the range finder 14 are provided in reference to FIGS. 4 and 5.

After the series of images are correlated with addresses in block 38, the address-correlated images may be used in publishing an online directory 40 at which each listing 72 (FIG. 1) can be displayed together with an actual image 74 of the address in the listing. In particular, one of the correlated images may be selected as a representative image, or best image, for the address. For example, if there are several images correlated with an address, the correlated image with geographic coordinates that are the closest to the geographic coordinates of the address may be selected as the representative image for that address. Alternatively, as discussed in more detail below, images may be voted on by users and an image with the most votes may be selected as the representative image for an address. The publication and operation of an online directory will be more fully described below.

Figure 4:
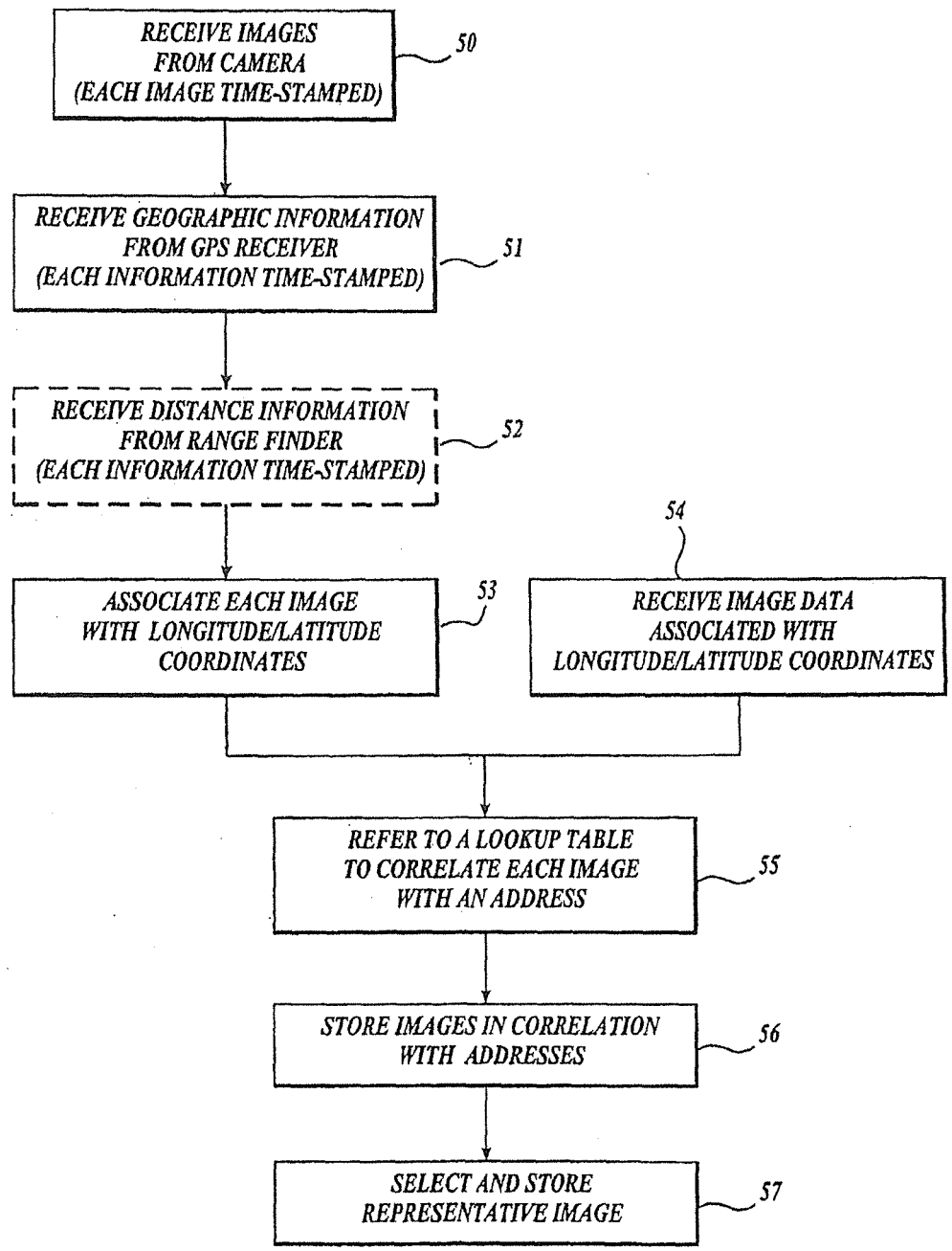
FIG. 4 is a flow diagram of one exemplary method for preparing images of objects collected at geographic locations for publication in an online directory according to one embodiment of the present invention.

Referring now to FIG. 4, a method of manipulating the data collected by the camera 10, the GPS receiver 12, and the range finder 14, for producing address-correlated image data is described. In block 50, images of objects (e.g., business structures) taken by the camera 10 are received wherein each image is time-stamped. In block 51, a series of geographic locations (longitude and latitude coordinates) that are also time-stamped are received from the GPS receiver 12. In block 52, if the range finder 14 is used, a series of time-stamped distance information obtained by the range finder 14 is received. In block 53, the image data, the longitude and latitude coordinate data, and the distance information (if obtained), are all associated with each other based on their respective time-stamps, to thereby associate each image with the particular latitude/longitude coordinates of the object featured in the image. As described above, only a subset of the entire set of images may be selected and used to minimize gaps and overlaps. Also as described above, when the geographic locations of certain images cannot be obtained directly from the GPS receiver 12, those locations can be calculated based on interpolation. Thereafter, in block 55, each image is correlated with an address. Multiple images may be correlated to the same address. Likewise, the same image may be correlated to multiple addresses. Correlation may be accomplished in any suitable manner, such as by assigning a corresponding address to each image, or by assigning a common identification number to each image and its address.

In block 56, each image is stored in correlation with its address. Note that, if a specialty mapping/surveying device that produces image data already embedded with GPS data is used, as described above, then blocks 50-53 may be replaced with a single block 54 at which such GPS data-referenced image data is received. As before, at this time, only a subset of the entire set of images (or image frames) captured by the camera 10 may be selectively received to minimize gaps and overlaps, and also, any geographic locations not directly obtainable from the GPS receiver 12 may be calculated based on interpolation. Thereafter, as before, the images are correlated in block 55 with addresses in reference to the lookup table 24, and the address-correlated images are stored at block 56.

Figure 6:
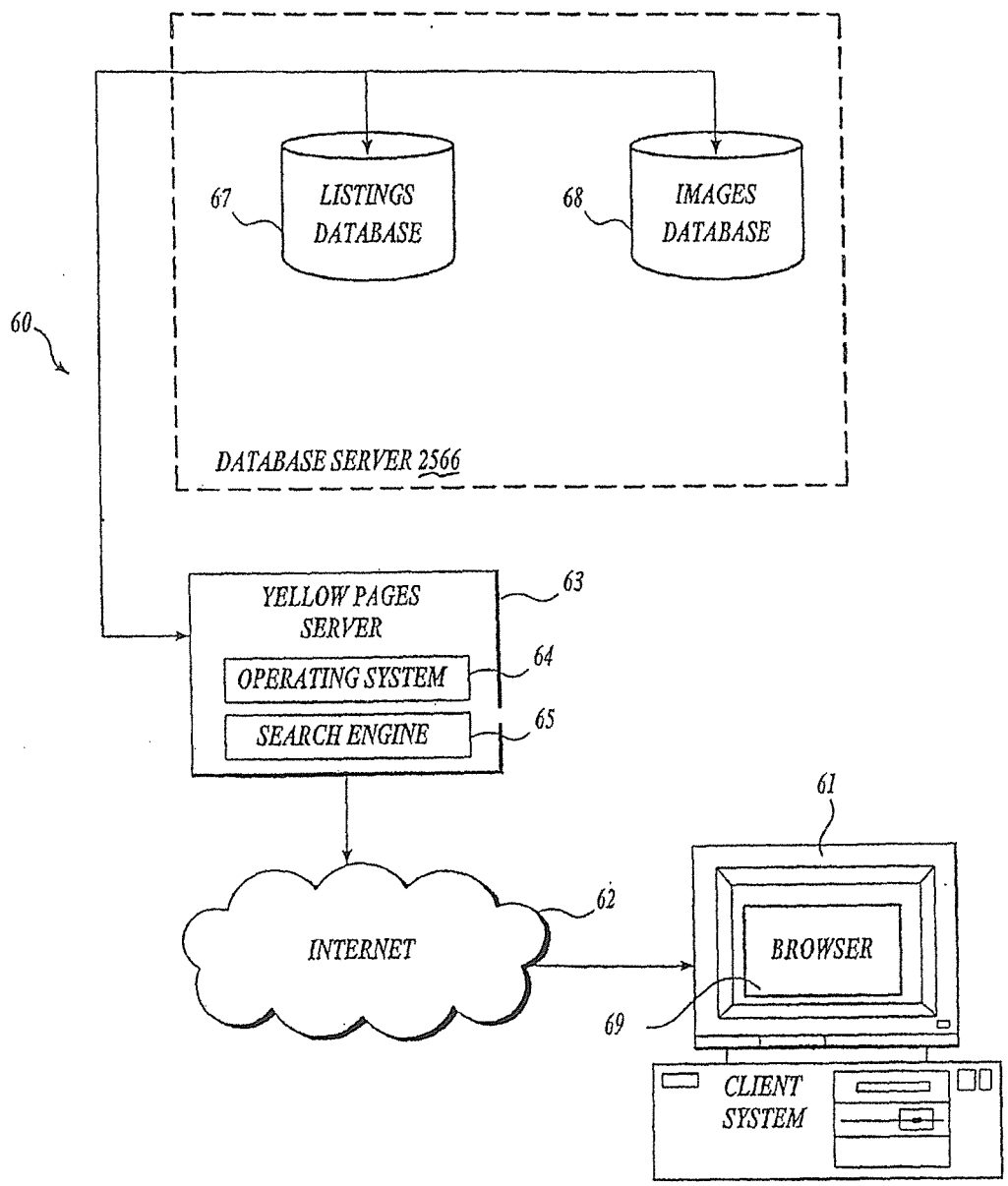
FIG. 6 is a block diagram showing an environment and arrangement of certain computing components for implementing an online directory according to one embodiment of the present invention.

Regardless of whether the system utilizes the process described with respect to blocks 50-53, or utilizes images already embedded with GPS data, as illustrated by block 54, the images may be correlated to addresses based on a boundary defined for each address. In one embodiment, address coordinates may be estimated using an algorithm, such as the algorithm supported by "Geocoding Server" available from MapQuest™. Alternatively, the total number of addresses on one side of a block may be determined and boundaries defined for each address that equally divide the block between addresses. In another embodiment, the block may be geographically divided based on an estimated size of the structures at each address. The estimated size of the structure and the estimated location of the address may be determined based on the number of addresses on a block in conjunction with the types of businesses, and/or number of businesses, occupying those structures. Business types may be obtained from a listings database 67 (FIG. 6). For each address boundary, regardless of what technique is used to define the boundary, all images associated with longitude/latitude coordinates within that boundary may be correlated to that address.

Figure 5:
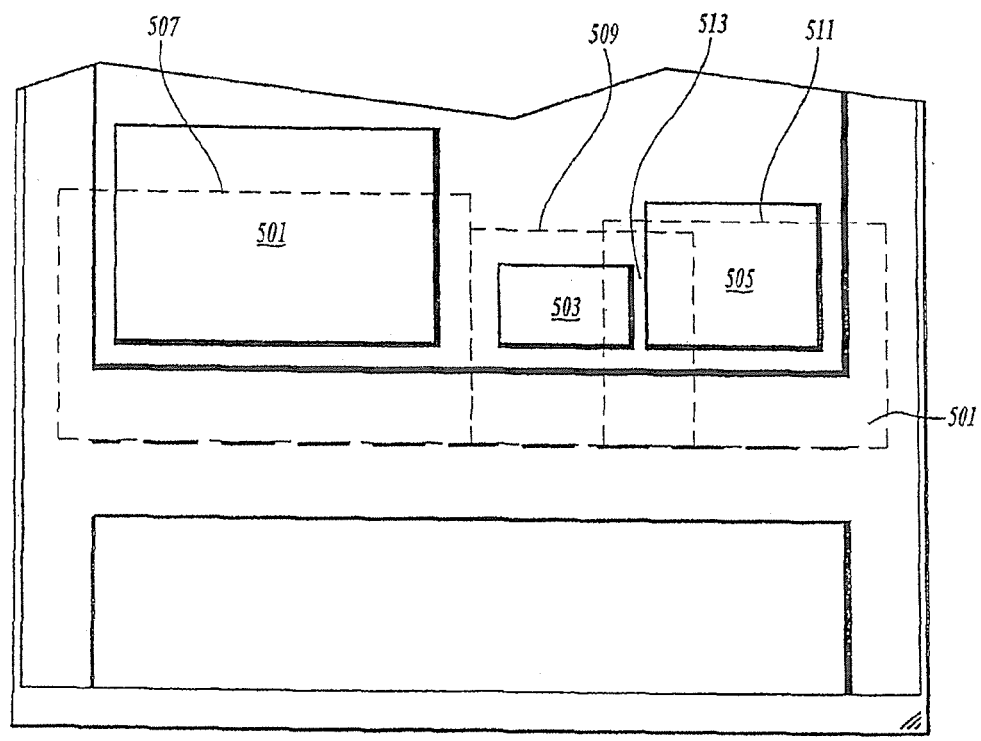
FIG. 5 is a block diagram showing a street block having three addresses, each of which has a defined boundary for which images may be correlated, in accordance with an embodiment of the present invention.

Referring to FIG. 5, if one side of a block 501 has three addresses 501, 503, 505 and it is known that the structure at address 501 contains a grocery store (i.e., it is likely a large structure), the structure at address 503 contains a shoe repair store (i.e., likely a small structure), and the structure at address 503 contains a convenience store (i.e., it is likely a medium size structure), the geographic area of the block may be divided based upon an estimated size of the structures at each address. Thus, for each address a boundary may be defined that encompasses the estimated size of the structure located at that particular address. For example, a large boundary 507 may be defined for the grocery store located at address 501, a small boundary 509 may be defined for the shoe repair store 503, and a medium size boundary may be defined for the convenience store 505.

A boundary defined for an address may be any shape and size, and the example of a rectangle illustrated in FIG. 5 is utilized for explanation purposes only. As will be appreciated, any other shape such as a circle, square, polygon, etc., may be used to define a geographic area surrounding an address. Additionally, boundaries may be defined such that they overlap one another, thereby allowing images falling within both boundaries to be assigned to multiple addresses. For example, boundaries 509 and 511 are defined such that they overlap 513. All images having associated longitude/latitude coordinates within the overlap 513 may be assigned to both address 503 and address 505. Overlapping boundary definitions ensures that all images obtained for a particular block are correlated to at least one address. Alternatively, boundaries may be defined for addresses such that there is no overlap. Defining boundaries for addresses increases the range with which images may be identified for correlation, thereby potentially increasing the number of images correlated to an address.

Returning to FIG. 4, in addition to correlating images for addresses, for each address, one image may be selected and stored as a representative image for that address, as illustrated by block 57. As discussed in more detail below, a representative image for an object may be displayed to a user as part of an address listing. For example, referring briefly to FIG. 7, for each address included in the address listing 707, a representative image, such as image 727, is provided. The representative image may be, for example, an image of the store front of the business. The representative image may be selected in a variety of ways. For example, the image with longitude/latitude coordinates that are nearest the longitude/latitude coordinates of the address, obtained from the lookup table 24, may be identified as the representative image for that address. As will be described in more detail below, the representative image, also referred to herein as the "best image," may be adjusted based on user input. For example, users may vote as to which of the images correlated with an address should be the representative image for that address. Those votes may be compiled and the image with a majority of the votes may be selected and stored as the representative image. Alternatively, a user, such as a business owner, may upload an image that is to be used as the representative image for an address. Allowing users to provide input (e.g., votes or images) for the representative image for an address and adjusting the representative image based on that input allows the system to improve its accuracy as to the images displayed in an online directory. In yet another example, the representative image may be selected by determining which of the correlated images is the best quality (e.g., clearest) image. Alternatively, the representative image may be the correlated image that was taken most recently in time. In another embodiment, a representative image may be selected based on the current season. For example, if it is the Christmas season, a representative image taken of the business during Christmas time may be selected. Alternatively, if it is summer, an image of the business taken during the summer may be selected as the representative image. As will be appreciated by one of skill in the relevant art, there are numerous ways for selecting a representative image and those mentioned above are only provided as examples. Any representative image selection technique may be used with embodiments of the present invention. Adjusting the representative image and other correlated images based on user input will be described in more detail with respect to FIGS. 8-13.

Address-correlated images, as described above, may be published in an online directory, or displayed as additional mapping information, as described in more detail below. FIG. 6 illustrates one environment for implementing an online Yellow Pages that includes a Yellow Pages system 60 and one or more client systems 61 (only one is shown), such as personal computers and PDAs that individual users can use to communicate with the Yellow Pages system 60. In the environment shown in FIG. 6, the client systems 61 communicate with the Yellow Pages system 60 via wired or wireless connections to one or more computer networks, such as the Internet 62. Protocols and components for communicating via the Internet are well known to those of ordinary skill in the art of computer network communications. The client system 61 requests and retrieves information from the Yellow Pages system 60 via a Web browser application 69 that provides the user with a graphical user interface to the Internet, as is also well known to those of ordinary skill in the art.

The Yellow Pages system 60 depicted in FIG. 6 operates in a distributed computing environment comprising several computer systems that are interconnected via communication links, e.g., using one or more computer networks or direct connections. However, it will be appreciated by those of ordinary skill in the art that the system 60 could equally operate in a computer system having fewer or greater number of components than are illustrated in FIG. 6. Thus, the description of the Yellow Pages system 60 in FIG. 6 should be taken as exemplary and not limiting to the scope of the invention. In particular, the Yellow Pages system 60 may comprise plural subsystems, each for performing a specific function in response to a request from a client system.

The Yellow Pages system 60 as illustrated includes both a Yellow Pages server 63 having an operating system 64 and a search engine 65, and a database server 66 having a listings database 67 and an images database 68. The Yellow Pages server 63, in this example, is a Web page server that supports an online Yellow Pages Web site on which each listing (e.g., business) can be displayed together with an image correlated with the listing. The Yellow Pages server 63 communicates text and graphics organized as a Web page using, for example, hypertext transfer protocols, in response to requests and search queries received from the client systems 61. The Yellow Pages server 63 also conducts searches of the databases 67 and 68 in the database server 66. The administration and overall operation of the Yellow Pages server 63 is controlled by its operating system 64, while its search function is performed by the search engine 65 in cooperation with the database server 66.

The database server 66 maintains the listings database 67 and the images database 68 that the Yellow Pages server 63 uses to respond to user requests and search queries. The listings database 67 contains information generally found in conventional Yellow Pages in a searchable form, i.e., numerous listings (business names together with their addresses, phone numbers, business type, etc.) searchable by their business names, addresses, phone numbers, business types, etc. The listings database 67 may also contain information such as the business hours, a brief description or profile, customer reviews, etc., of each business listed. The images database 68 contains digitized images of the businesses in correlation with the business addresses stored in the listings database 67. The database server 66 is configured to receive search instructions from the search engine 65 and return search results from the listings database 67 and the images database 68. Those of ordinary skill in the art will recognize that the Yellow Pages server 63 and the database server 66 will each typically employ a memory and main processor in which program instructions are stored and executed for operation of the servers.

The Yellow Pages system 60 enables a user to search and view online Yellow Pages in which each listing (e.g., business) is displayed with a representative image of an object (e.g., business building) taken at the geographic location of the business. Additionally, the online Yellow Pages may also include a street map identifying the location of each listing. FIGS. 7, 8, and 9A-9E illustrate sample graphical user interfaces, provided in the form of Web pages that can be displayed on the client system 61 in response to user requests and search queries.

Figure 7:
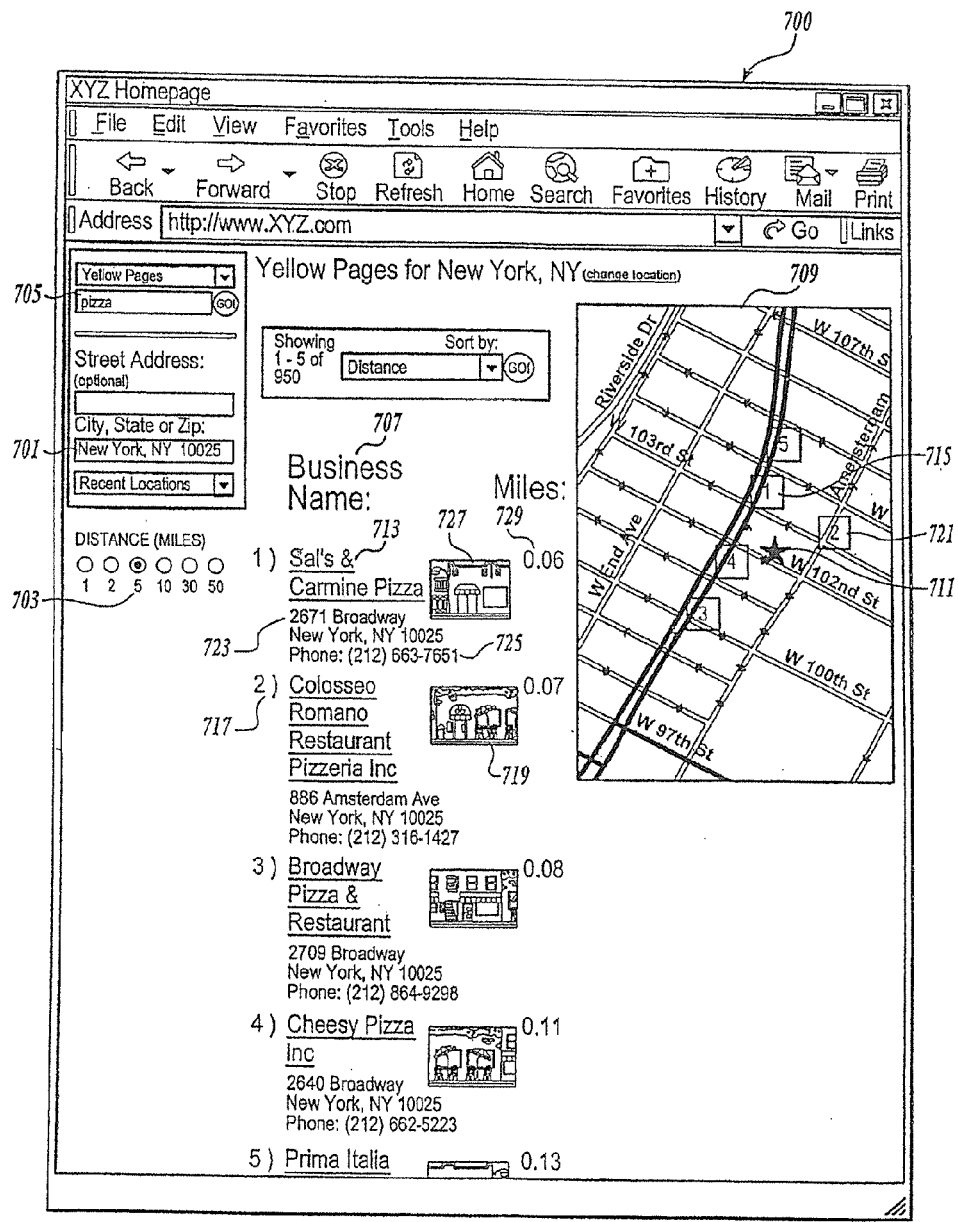
FIG. 7 is a pictorial diagram of a graphical user interface displaying an example of a listings page returned to a client system when a user requests to view the listings matching a search criteria, generated using embodiments of the present invention.

FIG. 7 illustrates a listings page 700 returned to a client system 61 when the user requests to view the listings for "pizza" 705 surrounding a particular location, in this example, "New York, N.Y. 10025" 701. The location for which the search is to be performed may be provided by a user submitting limitations (e.g., city, state, or zip code) or based on known user preferences, such as the user's home or work address. Additionally, a user may specify the distance 703 from the location 701 for which the search is to be performed.

The listings 707 matching the search criteria are presented in the listings page 700. Each listing includes the name of the business, such as "Sal's & Carmine Pizza" 713, the address of the business, such as "2671 Broadway, New York, N.Y. 10025" 723, the phone number of the business, such as "(212) 663-7651" 725, a representative image 727 of the business, and the distance 729 of the business from the user specified location. The display of a business listing is described in more detail with respect to FIGS. 9A-9E. The representative image may be one of the images previously correlated with the address in the listing (i.e., an image of the actual structure containing the business), the images either being previously taken or provided (e.g., uploaded) by a user. Additionally, the representative image may be a user-specific representative image (i.e., an image identified by the user performing the search as the preferred representative image). Alternatively, the image may be any image associated with the business, selected randomly or based on some other criteria.

The listings 707 may be organized based on any number of criteria. For example, the listings 707 may be organized by distance from the user specified location or alphabetically by business name. As will be appreciated by one of skill in the relevant art, the listings may be organized in any manner. The listings page 700 may also be configured to present all results matching the search criteria or a subset of the results with a link to additional pages containing additional matching results.

The listings page 700 may also include a street map 709 identifying the user specified location 711, and the location of each the businesses identified in the listing 707. For example, "Sal's & Carmine Pizza" 713 included in the listing 707 as the first item is identified in the street map 709 with a corresponding graphical icon, or identifier 715. The identifier may by the number of the business as included in the listing 707, an image of the structure in which the business is located, the trademark of the business, or any other identifier of the business.

The identifier 715, as well as each of the business names and corresponding images in the listing 707, may be interactive. For example, if a user positions a pointing device, such as a mouse pointer, over the business name or image included in the listing 707 the corresponding identifier included in the map 709 may be emphasized. Likewise, if a user positions a pointing device over an identifier, the corresponding business and image in the listing 707 may be emphasized. An identifier or listing may be emphasized by highlighting, changing the color, changing the size, changing the shape, or performing any other form of visual alteration on the identifier, image, or business name to thereby distinguish it from other material included on the listings page 700. For example, if a user positions a mouse pointer (not shown) over the business name "Colosseo Romano Restaurant Pizzeria Inc." 717, or over the corresponding image 719, the identifier 721 on the map 709 may be highlighted, thereby visually distinguishing the identifier 721 from the street map 709 and the other identifiers included on the street map 709.

In addition to the business names, corresponding images, and identifiers being interactive in that they may be emphasized, selection of any one of the business name, corresponding image, or identifier may result in a listing detail page 800 (FIG. 8) providing additional information about the selected business. A listing detail page 800 may also be presented in response to a user providing search criteria that result in only a single match. For example, if a user searches for "World Famous Ray's Pizza" in New York, N.Y., the listing detail page 800 may be presented instead of the listings page 700 (FIG. 7) as the results only returned one match.

For a selected business, a variety of information may be included in the listing detail page 800. For example, information such as the business name 801, business address 803, business telephone number 805, the representative image for the business 807, and a street map 809 identifying the location of the business may be displayed. Initially, the representative image may be the same representative image presented in the listings page 700 for the address. However, as described below, through interaction with the listing detail page 800, a user may alter the image that is presented as the representative image. As an example, for the representative image 807, the listing detail page 800 may include a "zoom in" icon 810, a "walk to the left" icon 813, and a "walk to the right" icon 815, any of which may be selected by a user to request a specific operation through the browser application 69 of the client system 61. Selection of the "walk to the left" icon 813 or "walk to the right" icon 815 may result in a different image, such as the geographically adjacent correlated image, being presented as the representative image.

A secondary group of correlated images 811 may also be included in the listing detail page 800 identifying other images that have been correlated with the address of the business 801 identified on the listing detail page 800. In one example, the secondary group of images may be presented in a filmstrip-type view by ordering and displaying the images in a geographic sequence. For example, the filmstrip-type view of secondary images 811 may include six images 817, 819, 821, 823, 825, and 827. However, any number of images may be displayed. Additionally, in another embodiment, the images may be ordered and displayed based on the time at which the images were taken. Additionally, the images presented as the secondary images may be selected based on the season. For example, if the current season is fall, the secondary images presented may be images correlated with that address which were taken in the fall.

Each of the secondary group of images 817-827 may be interactive in that a user may position a pointing device, such as a mouse pointer, over one of the images and that image will temporarily replace the representative image 807.

Additionally, the secondary group of images 811 may also include a "walk to the left" icon 832 and a "walk to the right" icon 834, allowing a user to view additional correlated images to the left or right of the business identified in the listing detail page 800. For example, if a user selects "walk to the right" icon 834, the next geographic image correlated with the business would be displayed in the secondary set of images 811. Still further, the secondary group of images 811 may include a "scroll to the left" icon 831 and a "scroll to the right" icon 833, allowing a user to view the next set of correlated images to the left or right of the currently displayed set of images. For example, if a user selects "scroll to the left" icon 831, six new images are displayed as the correlated images 811. The six new images displayed are the six images that are geographically to the left of the current set of displayed correlated images.

Still further, in an embodiment of the present invention, a user may specify, or vote, which image of the secondary group of images 811 they perceive as being the appropriate representative image for the business identified in the listing detail page 800. For example, a user may specify that image 823 is the appropriate representative image for the business "World Famous Ray's Pizza" 801 because the image includes a centered view of the structure containing "Ray's Pizza." Such selection, or voting, may be accomplished by a user selecting (or clicking) the best image box 835 under the image 823. In response to a selection by a user of a representative image, the system 60 stores that image as the user's own personal choice of the representative image for that business at that address. If the user, at a later time, uses the system 60 and obtains information for "World Famous Ray's Pizza," either in a listings page 700 or listing detail page 800, the user selected image will be presented as the representative image. Additionally, the user's vote for that particular image as the best image is saved with respect to that image and the corresponding business address and used to determine what image should be used as a default representative image for the business. A default representative image is provided as the representative image for a business to users who have not selected a representative image for that business. As discussed below in more detail, with respect to FIG. 12, votes may be tallied from multiple user selections as to what image should be the representative image, and the image with the majority of votes may be used as the default representative image for a particular business.

In an embodiment of the present invention, a user may also provide information and images with respect to a business address via the listing detail page 800. For example, a user may upload his or her own images that may be correlated with a particular business or address. In particular, a business owner may upload an image of the store front that may be associated with the owner's business and provided as the default representative image. In addition to images being provided and correlated with a particular business, other information, such as menus, hours of operation, employee information, and other types of business-related information may also be provided (e.g., uploaded) and associated with a particular business. Such other business-related information may be included on the listing detail page 800.

Also included in the listing detail page 800 may be a link 839 to similar types of businesses. For example, the system 60 may determine from the listings database 67 that "World Famous Ray's Pizza" 801 is of a business type "pizza" and thereby provide a link 839 to other businesses of the type "pizza."

In addition, links 837 to businesses nearby (e.g., on the same street) the selected business may also be provided in the listing detail page 800. The links 837 to nearby businesses may include the business name, business address, telephone number, and optionally, the representative image for the business. The links 837 may be divided up to illustrate links 841 to businesses on the same side of the street as the current business and links 843 to businesses on the other side of the street.

Alternatively, or in addition thereto, the listing detail page 800 may include a link, such as "what's on the other side of the street" (not shown), that if selected will provide a user with information and images for the businesses on the other side of the street. Additionally, such a link may present a full image of the other side of the street. Such an image helps to give additional context to the location of the business for which information is provided in listing detail page 800. Alternatively, a link such as "See other business on this street" (not shown) may be provided. Selection of this link would provide a user with information about businesses on the current street, not just on the other side of the street. Still further, a link to video of the neighborhood where the business is located may also be provided. The video provided in response to selection of such a link may be, for example, a portion of the video data gathered by the vehicle 9 (FIG. 1) as it traveled down the street on which the business identified in the listing detail page 800 is located. In another embodiment, the detail page 800 may include a link of "Map this location" (not shown). Selection of this link provides a map view of the current geographic location, as described in more detail with respect to FIG. 15.

Figure 9A:
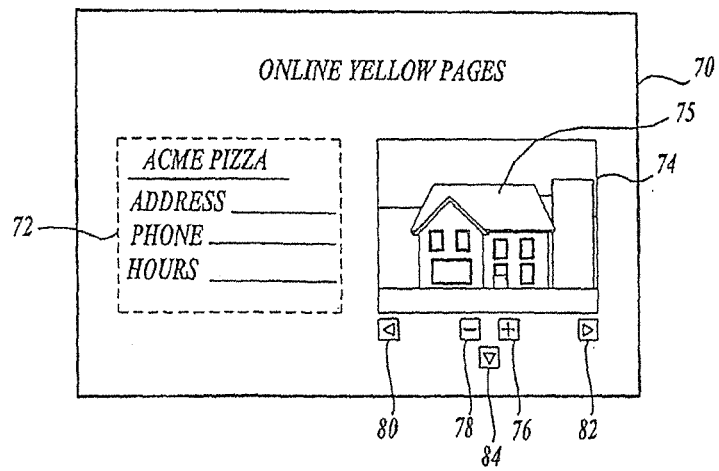
FIGS. 9A-9E depict examples of graphical user interfaces in the form of Web pages received from a directory server and displayed on a client system, illustrating sample operations of an online directory in accordance with the present invention.

FIG. 9A illustrates a detailed view of the address information and corresponding representative image that may be presented in FIG. 7 as part of the listing 707 or as an alternative to the listing detail page 800. The Web page 70 displays the listing 72 of "ACME Pizza," which meets the user's search criteria. The listing 72 includes the name of the business, the address and phone number of the business. Additionally, an image 74 of the business previously taken, correlated with the address in the listing (i.e., an image of the actual structure containing "ACME Pizza" 75 in this case), and identified as the representative image (either default or user specific) is displayed. While the image 74 is automatically displayed together with the display of the listing 72 in this example, it is possible to first display only the listing 72 with a "view image" icon (not shown), and then display the image 74 only upon the user's selection (e.g., clicking) of the "view image" icon. The Web page 70 of address information and corresponding image may further display a "zoom in" icon 76, a "zoom out" icon 78, a "scroll to the left" icon 80, a "scroll to the right" icon 82, and a "what's on the other side of the street" icon 84, any of which can be selected by the user to request a specific operation through the browser application 69 of the client system 61, as will be described with specific examples below. It should be understood that the indicia of these icons are not limited to those illustrated in FIG. 9A. For example, the "zoom in" and "zoom out" icons may display the actual text "zoom in" and "zoom out," as opposed to the plus and minus signs shown in FIG. 9A.

Figure 9B:
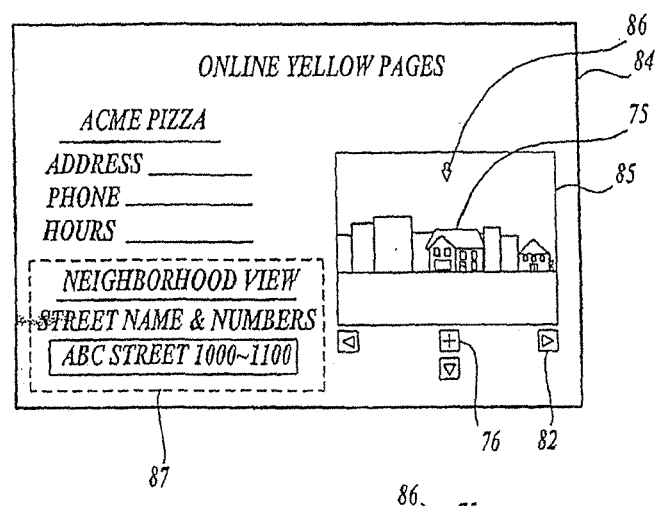

FIG. 9B illustrates a sample Web page 84 created in response to the user's selection of the "zoom out" icon 78 in FIG. 9A, showing a zoomed-out image 85 of "ACME Pizza" 75. Specifically, a wider range of street addresses surrounding (perhaps centering on) the address of "ACME Pizza" is specified according to a predefined program instruction (by the Yellow Pages server 63 of FIG. 6, for example), and the image (or images) corresponding to the specified range of street addresses is retrieved and displayed. An arrow 86 may be displayed to indicate where "ACME Pizza" 75 is in this zoomed-out view. If the image 85 cannot be further zoomed-out, the zoom-out icon 78 need not be displayed and only the zoom-in icon 76 may be displayed at this time. The zoomed-out image 85 is helpful for the user to appreciate the overall neighborhood view surrounding "ACME Pizza." Referring to a box 87, the neighborhood information, for example, the range of street numbers included in the image 85, may be displayed.

Figure 9C:
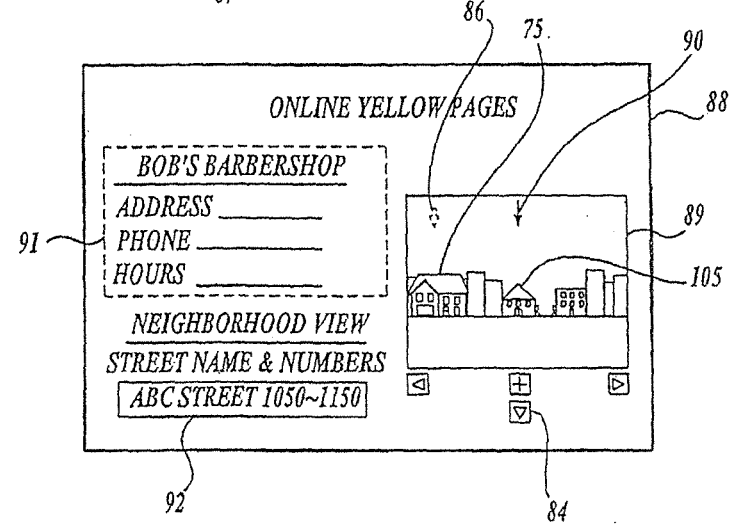

FIG. 9C illustrates a sample Web page 88 created in response to the user's selection of the "scroll to the right" icon 82 in FIG. 9B, showing an image 89 of the neighborhood still including "ACME Pizza" 75 but as shifted to the right (thus showing "ACME Pizza" 75 at the left of the screen). The range of street addresses shown previously in FIG. 9B may be shifted to the right by a specific amount according to a predefined program instruction, and the image (or images) corresponding to the shifted range of street addresses is retrieved and displayed. The arrow 86 may continue to be displayed to indicate where "ACME Pizza" 75 is in this scrolled-to-the-right view. The scroll-to-the-right feature may be limited so that the business of initial interest, "ACME Pizza" 75 in this example, will not disappear from the view. Alternatively, the scroll-to-the-right feature (or the scroll-to-the-left feature) may be unlimited and may continue to function as long as the addresses (and the images) are available to the right or left of the image currently shown.

Additionally, a second arrow 90 may be displayed to point to the address (business) at the center of the displayed image 89 ("Bob's Barbershop" 105 in the illustrated example). In this embodiment, the listing information (the business name, address, phone number, business hours, etc.) of the business that the second arrow 90 points to may be displayed, as in box 91. Thus, as the user scrolls the view to the right (or to the left), the listing information of a different business (as centered in the image) is sequentially displayed so that the user can appreciate what types of businesses are located along the street. Also, as the user scrolls the view to the right (or to the left), the street number range displayed in box 92 is updated to reflect what numbers are shown in the image at any given time. For example, FIG. 9B showed an image of "ABC Street 1000-1100" (box 87), while FIG. 9C shows an image of "ABC Street 1050-1150" (box 92), indicating that the image in FIG. 9C has been shifted by 50 street numbers to the right from FIG. 9B.

Figure 9D:
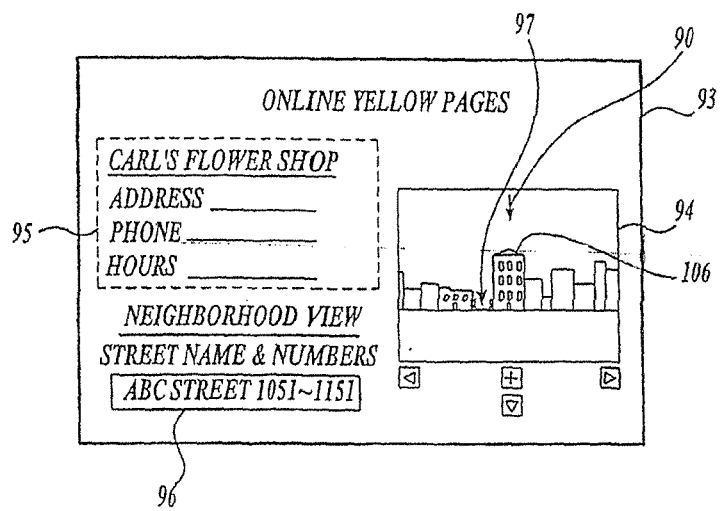

FIG. 9D illustrates a sample Web page 93 created in response to the user's selection of the "what's on the other side of the street" icon 84 in FIG. 9C, showing an image 94 of the neighborhood (at the same scale) that is on the other side of the same street as shown in FIG. 9C. Specifically, a range of street addresses that are on the other side of the same street as shown in FIG. 9C is identified according to a predefined program instruction, and the image (or images) corresponding to the new range of street addresses is retrieved and displayed. The second arrow 90 points to a business located at the center of the image (i.e., directly across the street from "Bob's Barbershop" 105 in FIG. 9C), which is "Carl's Flower Shop" 106, as listed in box 95. As before, the range of street numbers included in the image may be displayed, as in box 96. In the illustrated example, FIG. 9C showed an image of "ABC Street 1050-1150" (even numbers, in box 92), while FIG. 9D shows an image of "ABC Street 1051-1151" (odd numbers, in box 96). The "what's on the other side of the street" feature permits the user to appreciate the neighborhood view along either side of the same street. As in FIG. 9C, when the user scrolls the image 94 of FIG. 9D to the right or to the left, the listing information in the box 95 can be changed to refer to the business presently centered in the image 94 (and pointed to by the second arrow 90).

In FIG. 9D, note that a street 97 extends perpendicular to "ABC Street" (i.e., into the plane of FIG. 9D), indicating the existence of an intersection. Especially at an intersection, the user may wish to obtain a 360-degree view to appreciate the overall atmosphere of the location. Thus, in addition to the images of individual businesses as described above, 360-degree views of selected locations such as intersections may be obtained and correlated with their addresses (e.g., ABC Street and XYZ Boulevard), and stored in the database server 66.

Figure 9E:
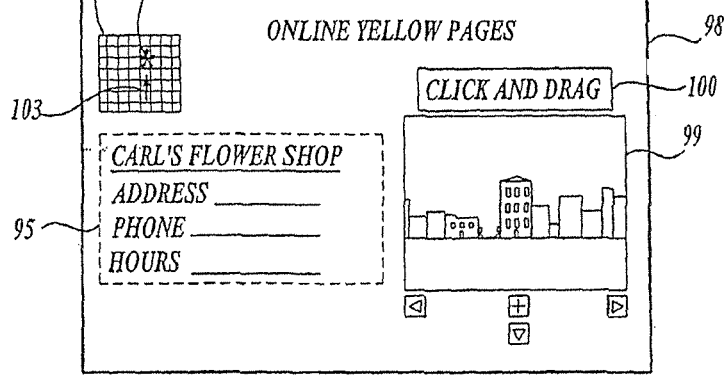

FIG. 9E illustrates a sample Web page 98 suitable for permitting the user to manipulate the view, for example, to obtain a 360-degree view of a selected location. Specifically, when a 360-degree view is available, a "Click and Drag" icon 100 may appear to prompt the user to click and drag a cursor on the image 99 itself in the direction in which the user wishes to see a further view. For example, if the user clicks and drags a cursor on the image 99 continuously to the right, then the point of view continuously moves to the right until a complete 360-degree view is obtained. Additionally, clicking and dragging a cursor along a street may shift the point of view along the street to obtain a view as if the user is walking along the street. (Similar to using the "scroll to the right" or "scroll to the left" features, described above.) Specific implementations of a click-and-drag feature are known in the art of virtual reality computing, and need not be described in detail herein. To assist the user in orienting where the user is, a map 101 surrounding the user's current cursor location 102 on the image 99 may be displayed, together with the direction in which the user's view is facing (in the form of an arrow 103). Still alternatively, it is contemplated that the user may click on the map 101 to request and display a neighborhood view of the location clicked, depending on images available in the database server 66.

It is emphasized that FIGS. 9A-9E, as described above, are merely samples of individual business listings that may be displayed individually or in conjunction with other businesses in a listing 707 (FIG. 7). Additionally, FIGS. 9A-9E illustrate examples of how those business listings may be manipulated. As discussed above, selection of the interactive business name or representative image may result in a listing detail page 800 (FIG. 8) that provides still further information regarding a business listing.

While it has been described that address-correlated images are initially stored and retrieved based on a user's inquiry, it is possible to store images in association with geographic locations only, and then correlate an address entered or requested by a user with a particular image later, for example, on-the-fly at the time the user specifies an address.

Figure 10:
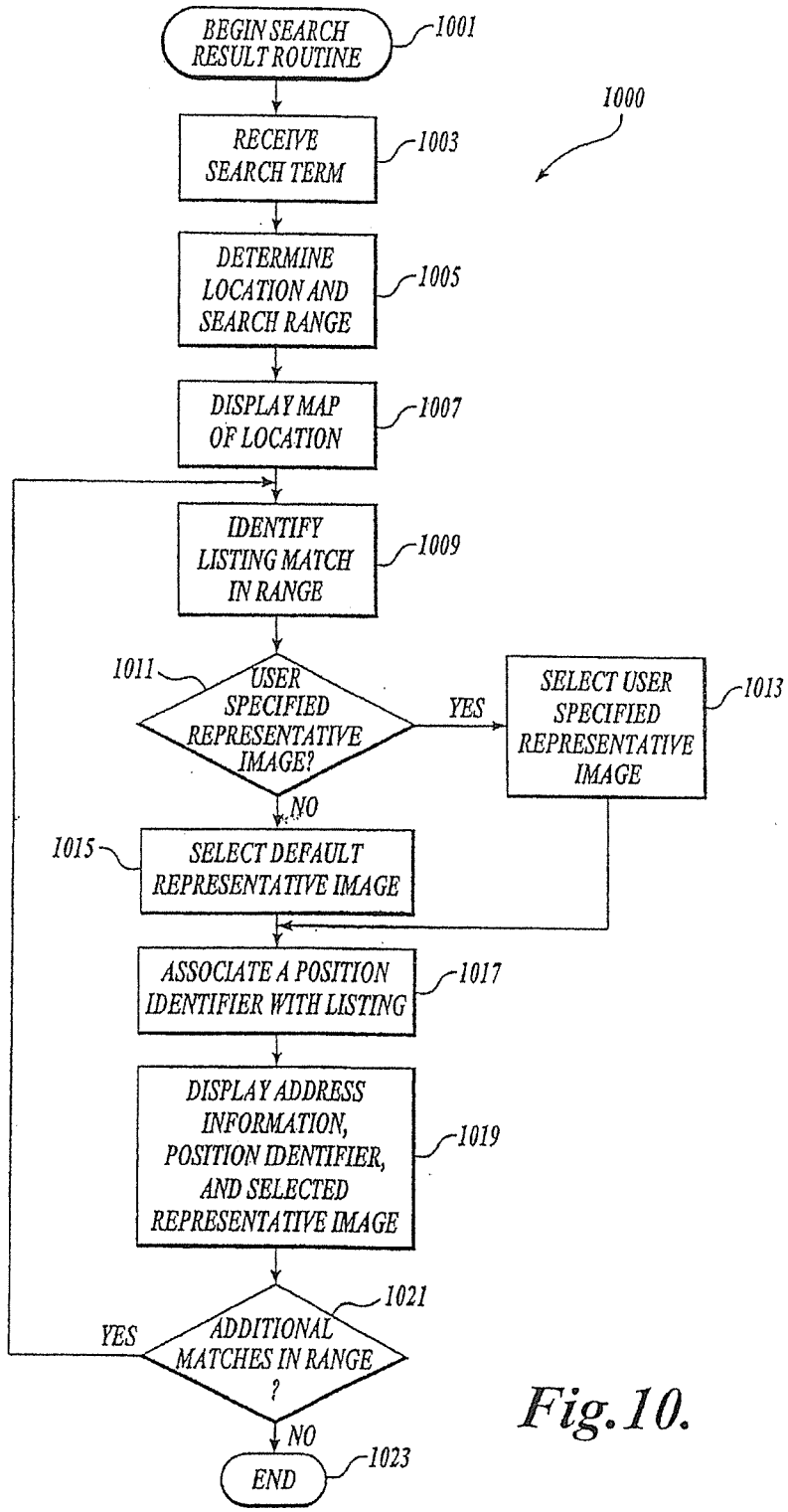
FIG. 10 is a flow diagram of a search results routine utilized to provide listing information in response to a user-provided search request, in accordance with an embodiment of the present invention.

FIG. 10 is a flow diagram of a search results routine utilized to provide listing information in response to a user-provided search request, in accordance with an embodiment of the present invention. The search routine 1000 begins at block 1001. At block 1003, a search term is received. For example, as discussed above, a user may provide any type of search term for searching for businesses or other addresses, such as to search for all business of the type "pizza."

Upon receipt of a search term at block 1003, at block 1005, the location and search range are determined. The location may be a user-specified location for which the search is to be performed or determined based upon user preferences, such as the user's home address. The search range may also be specified by the user and may be any predetermined range for which a search is to be performed. Once the location and search range have been determined, at block 1007, a map, such as a street map, of the identified location is displayed in a graphical user interface, such as a Web page. In addition to displaying a map of the location at block 1007, at block 1009, a search routine 1000 identifies a listing contained in the listings database 67 that matches the received search terms. At decision block 1011, it is determined whether a user has previously selected a representative image for the identified listing. As discussed above, a representative image may be specified by a user selecting one of a plurality of correlated images for a specific listing as the appropriate representative image for the listing. Any such selection is stored for that particular user as being that user's specified representative image for that address. If it is determined at decision block 1011 that there is a user-specified representative image, at block 1013 that user-specified representative image is selected. However, if it is determined at decision block 1011 that there is no user-specified representative image, at block 1015, the default representative image assigned to the identified listing is selected. A default representative image may be assigned based on either a plurality of votes from other users selecting a representative image for a particular listing, based on the geographic coordinates of the address itself and the correlated image with the closest matching geographic coordinates, or based on selection by the business owner, to list a few examples.

Upon selection of a representative image at either block 1013 or block 1015, at block 1017, a position identifier is associated with the listing. A position identifier may be the number associated with a listing as it is presented to the user or any other identifying criteria such as the representative image or an aerial image of the structure at that address. At block 1019, the identified address information, position identifier, and selected representative image are each displayed to the user via a graphical user interface, such as a Web page. The address information and corresponding image may be displayed adjacent to one another as a listing, and the position identifier may be presented in the map displayed at block 1007 at a position where the business is located within the map. For example, referring back to FIG. 7, address information and corresponding images, such as address information 713, 723 and corresponding image 727, are displayed adjacent to each other as part of the listing 707. Likewise, a position identifier 715 for that address is presented in the map 709.

At decision block 1021, it is determined whether there are any additional listings that match the search terms received at block 1003 that are within the range identified at block 1005. If it is determined at decision block 1021 that there are additional matches, the routine 1000 returns to block 1009 and continues. However, if it is determined at decision block 1021 that there are no additional matches, the routine completes, as illustrated by block 1023.

Figure 11:
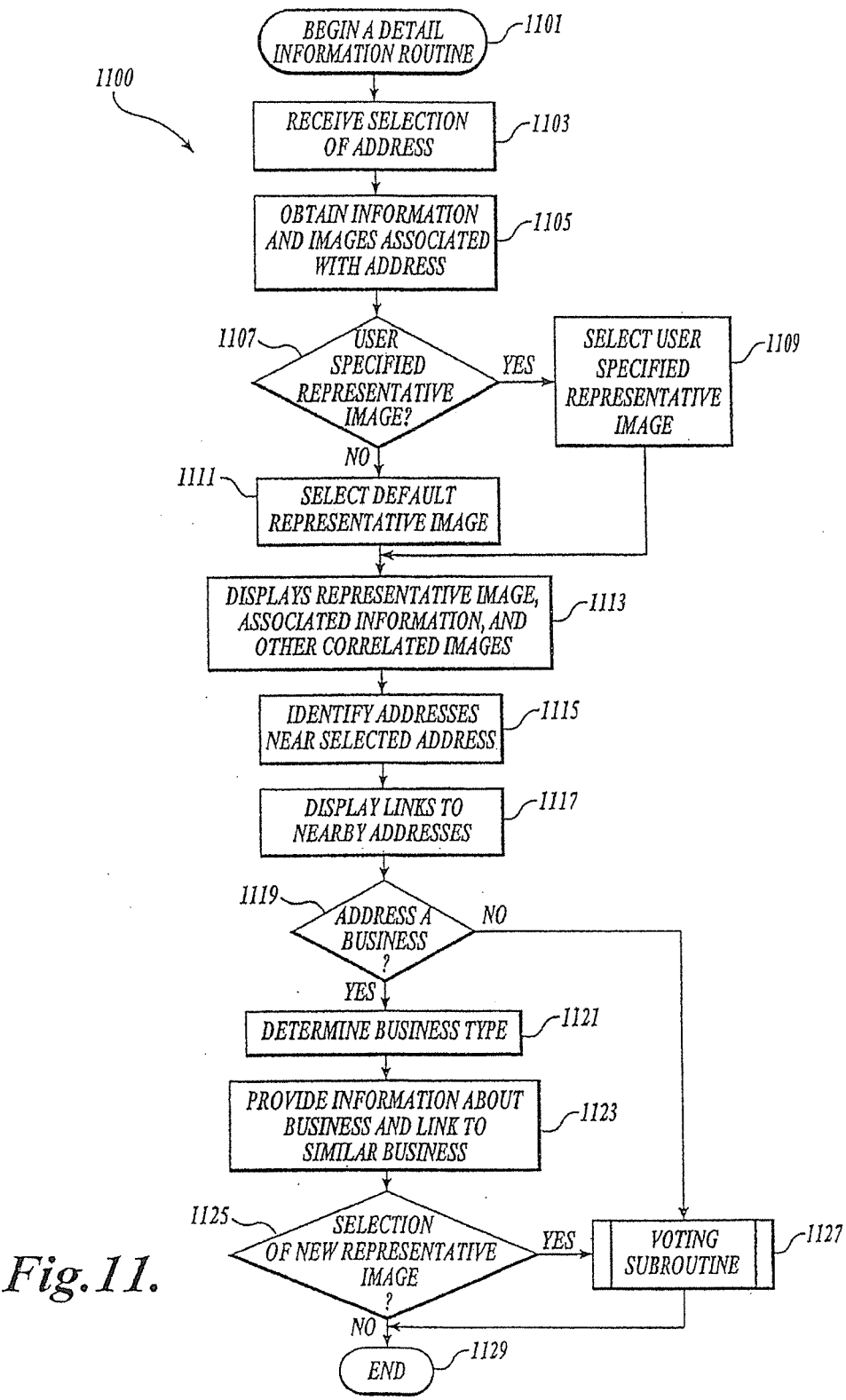
FIG. 11 is a flow diagram of a details information routine for presenting a detailed information view of a selected address, in accordance with an embodiment of the present invention.

FIG. 11 is a flow diagram of a details information routine for presenting a detailed information view of a selected address, in accordance with an embodiment of the present invention. The address selection routine 1100 begins at block 1101. At block 1103, a selection of an address is received. An address selection may be received in response to a user selecting a particular address from a listing view of several addresses. Alternatively, an address selection may be received in response to a user providing a search term that only returns one matching search result or by a user providing a particular address for which information is desired.

Upon receipt of an address at block 1103, at block 1105, information associated with the address, such as business information, and images previously correlated with the particular address are obtained from the listings database 67 and the images database 68. At decision block 1107, it is determined whether a user has previously selected a representative image for the particular address for which a selection was received. If it is determined at decision block 1107 that there is a user-specified representative image, at block 1109, that user-specified representative image is selected for the particular address. However, if it is determined at decision block 1107 that there is no user-specified representative image, at block 1111, a default representative image is selected. At block 1113, the selected representative image, associated information, and other correlated images for the particular address are displayed in a single graphical user interface, such as a Web page. For example, referring back to FIG. 8, a representative image 807, associated information 801, 803, 805, and other correlated images 817, 819, 821, 823, 825, 827 are displayed in a listing detail page 800.

As discussed above, defining boundaries for an address and correlating all images geographically-located within a defined boundary may result in multiple images being associated with the same address. Those correlated images may be displayed based on their geographic location, the time at which they were taken, based on the season, etc., thereby resulting in what appears to be an overall filmstrip-view of the block on which the selected address is located. The filmstrip-view of images may include the selected representative image that is also displayed as a larger image in the same graphical user interface.

In addition to displaying the selected representative image, associated information, and other correlated images, at block 1115, links to addresses near the selected address may also be provided. The links to nearby addresses may be interactive, and selection of one of those links may result in the routine 1100 being performed for the address identified by the selected link and ultimately a new graphical user interface being provided, containing information for the selected address, a representative image and other correlated images.

At decision block 1119, it is determined whether the selected address received at decision block 1103 is a business address. Such a determination may be made by reviewing the address contained in the listings database 67. If it is determined that the selected address is not a business address, the address selection routine 1100 may proceed to the voting subroutine illustrated by block 1127 and described in more detail with respect to FIG. 12. In an alternative embodiment, if it is determined that the selected address is not a business address, e.g., it is a residential address, the routine 1100 may obtain and provide additional information, such as a telephone number for the address. However, as illustrated in FIG. 11, providing additional information for a non-business address may not be performed due to individual privacy concerns.

Figure 8:
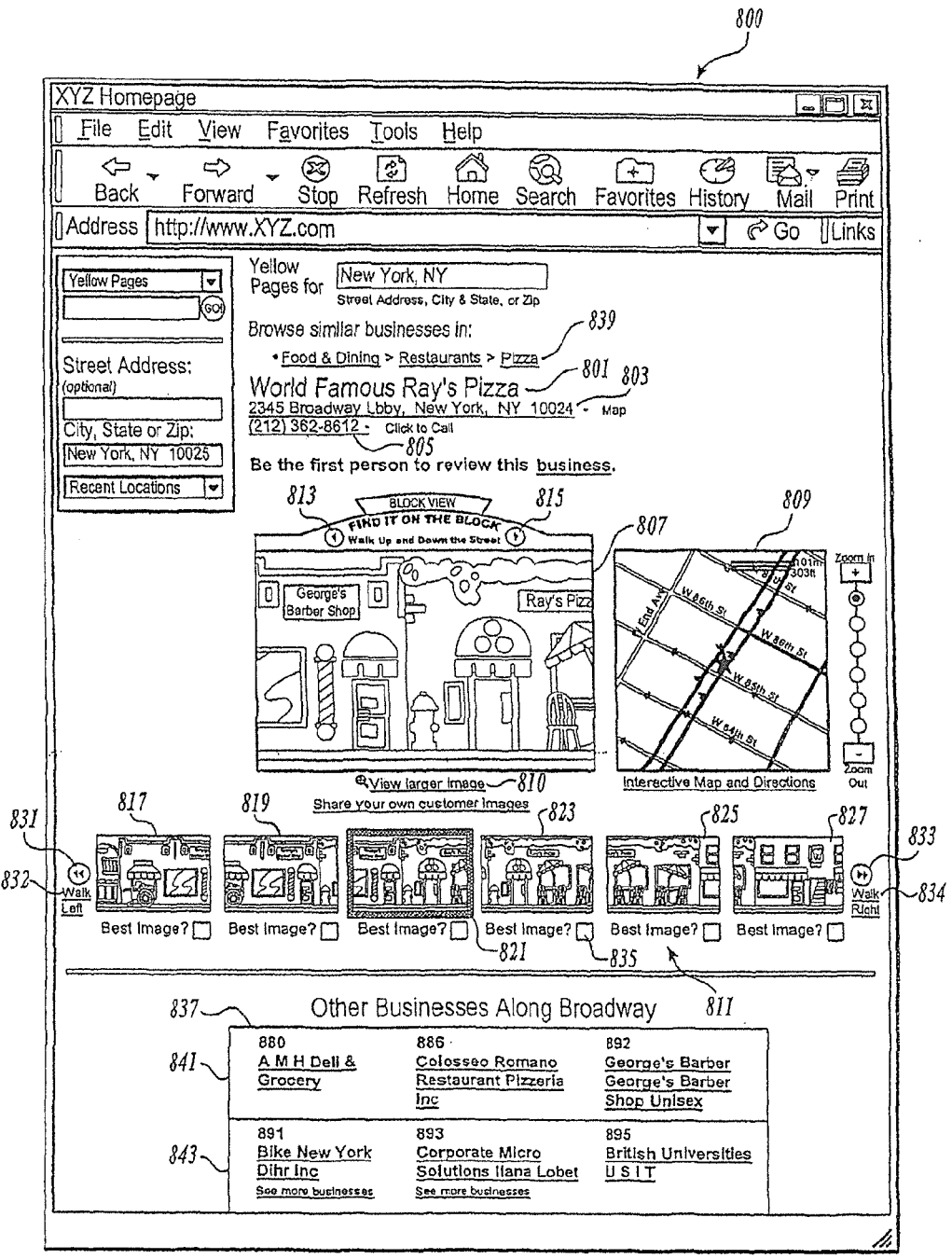
FIG. 8 is a pictorial diagram of a graphical user interface displaying an example of a listing detail page returned to a client system when a user requested detailed information for a particular listing, generated using embodiments of the present invention.

However, if it is determined that the selected address is a business address, at block 1121, the type of business address is determined by obtaining such information from the listings database 67. Upon determination of a business type, at block 1123, information about similar businesses and links to those businesses may be provided. For example, a single link to similar businesses may be provided in a detail view, such as the listing detail page 800 (FIG. 8). Selection of a link to similar businesses may result in a new listings display window (such as listings page 700 of FIG. 7) identifying one or more business addresses and corresponding representative images. Alternatively, several links may be included in the graphical user interface identifying several businesses similar to the business type of the business located at the selected address received at block 1103. At block 1125, a determination is made as to whether a user has provided a selection of what they view as the appropriate representative image. If it is determined at block 1125 that a user has provided a selection of a representative image, the address selection routine 1100 continues to the voting subroutine, as illustrated by subroutine block 1127 and described in detail below. However, if it is determined at decision block 1125 that a user has not selected a new representative image or upon completion of the voting subroutine 1127, the address selection routine 1100 completes, as illustrated by block 1129.

Figure 12:
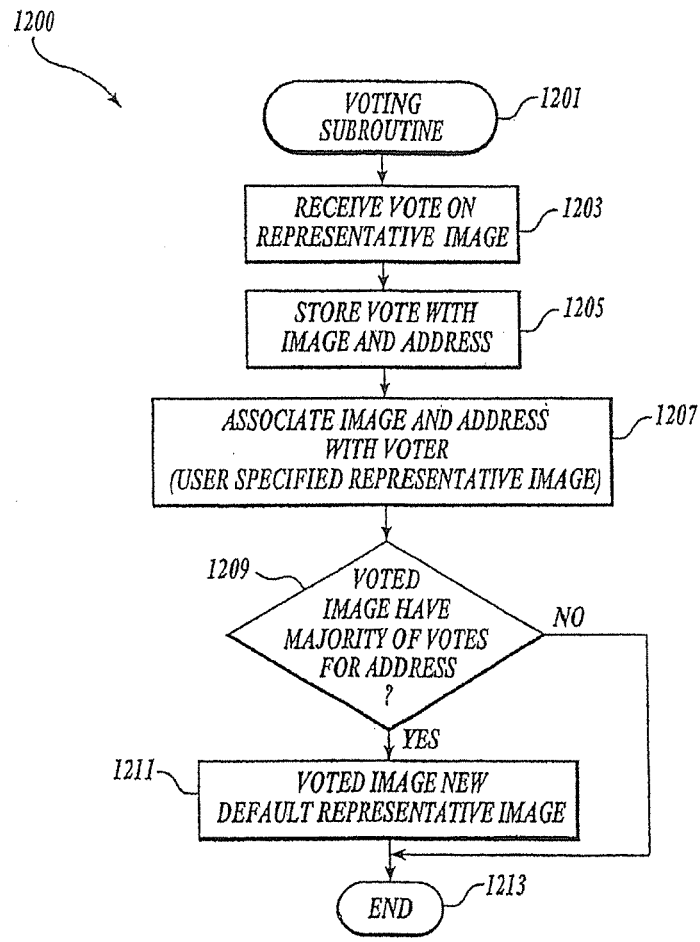
FIG. 12 is a flow diagram of a voting subroutine for designating a representative image for a geographic location in response to user selections, in accordance with an embodiment of the present invention.

FIG. 12 is a flow diagram of a voting subroutine for designating a representative image, for a geographic location in response to user selections, in accordance with an embodiment of the present invention. The voting subroutine 1200 begins at block 1201. At block 1203, a vote for a best image is received from a user. As discussed above, in a details graphical user interface, such as listing detail page 800 (FIG. 8), a user may be presented with a plurality of images, each of which is correlated to a particular address. A user may select one of those images as being the one that the user perceives as the appropriate representative image for the corresponding address. Upon receipt of a selection or vote for a representative image at block 1203, at block 1205, the vote is stored and associated with the image and address. Additionally, at block 1207, the selected image and the address are associated with the voter (user) so that future selections of that address by that user result in the selected image being displayed as the representative image for that address. At decision block 1209, a determination is made as to whether the voted upon image has a majority of votes for the particular address. If it is determined at decision block 1209 that the voted image does not have a majority of the votes, the subroutine completes, as illustrated by block 1213. However, if it is determined that the voted image does have a majority of the votes for that particular address, at block 1211, that image is identified as being the default representative image for that address. As discussed above, the default representative image is provided to users who have not previously selected a representative image for that address.

Figure 13:
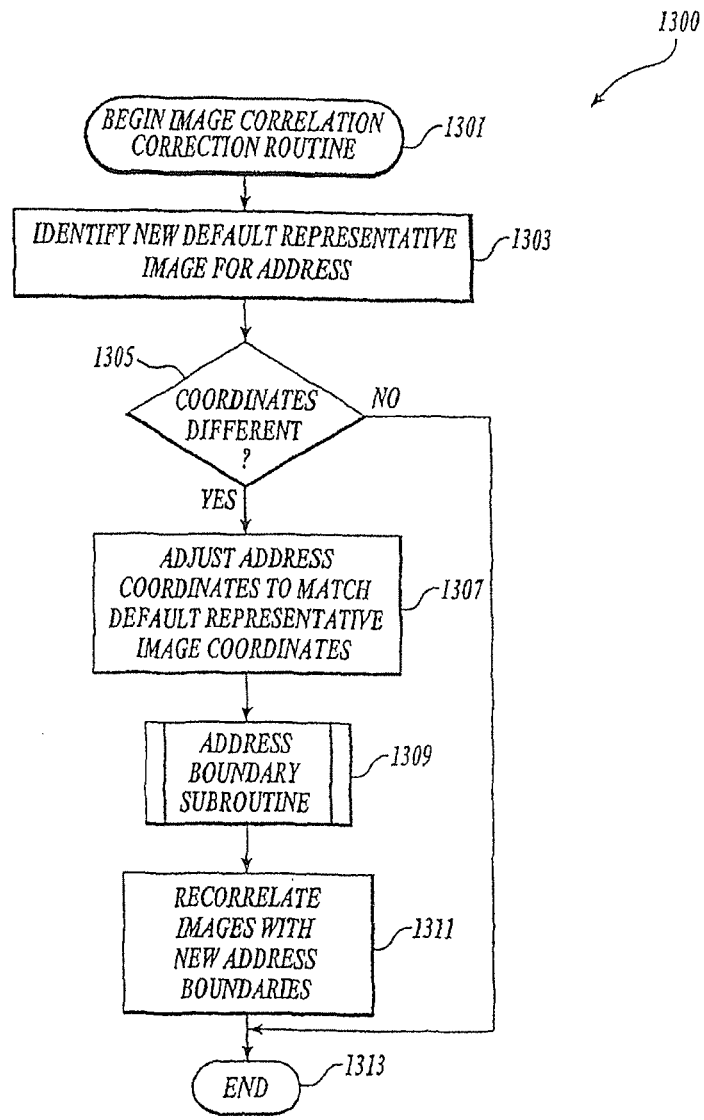
FIG. 13 is a flow diagram of an image correlation correction routine for adjusting the address coordinates for the geographic location of a particular address and re-correlating images to a particular address, according to an embodiment of the present invention.

FIG. 13 is a flow diagram of an image correlation correction routine for adjusting the address coordinates for the geographic location of a particular address and re-correlating images to a particular address, according to an embodiment of the present invention. The image correlation correction routine 1300 begins at block 1301. At block 1303, a user voted upon default representative image for a particular address is identified. As described above, a default representative image for a particular address may be identified based on a plurality of votes received from different users voting as to which image is perceived to be the appropriate representative image for a particular address. Upon identification of a default representative image for an address at block 1303, at decision block 1305, it is determined whether the coordinates for the image are sufficiently different from the coordinates of the address. The coordinate comparison at decision block 1305 may be determined based on a predetermined threshold. For example, if it is determined that the difference between the address coordinates and the default representative image coordinates is beyond a predetermined threshold, at block 1307, the address coordinates are adjusted to match the default representative image coordinates. However, if it is determined at decision block 1305 that the coordinates are not sufficiently different, the routine completes at block 1313.

Upon address coordinate adjustment at block 1307, at block 1309, an address boundary subroutine is performed, as described in more detail below with respect to FIG. 14. Upon completion of the address boundary subroutine at block 1309, at block 1311, images from the images database 68 are re-correlated based on the new address boundary, or boundaries, defined by the address boundary subroutine 1400. Upon re-correlation of the images at block 1311, or if it is determined at decision block 1305 that the coordinates of the address and the default representative image are not sufficiently different, the image correlation correction routine 1300 completes at block 1313.

Figure 14:
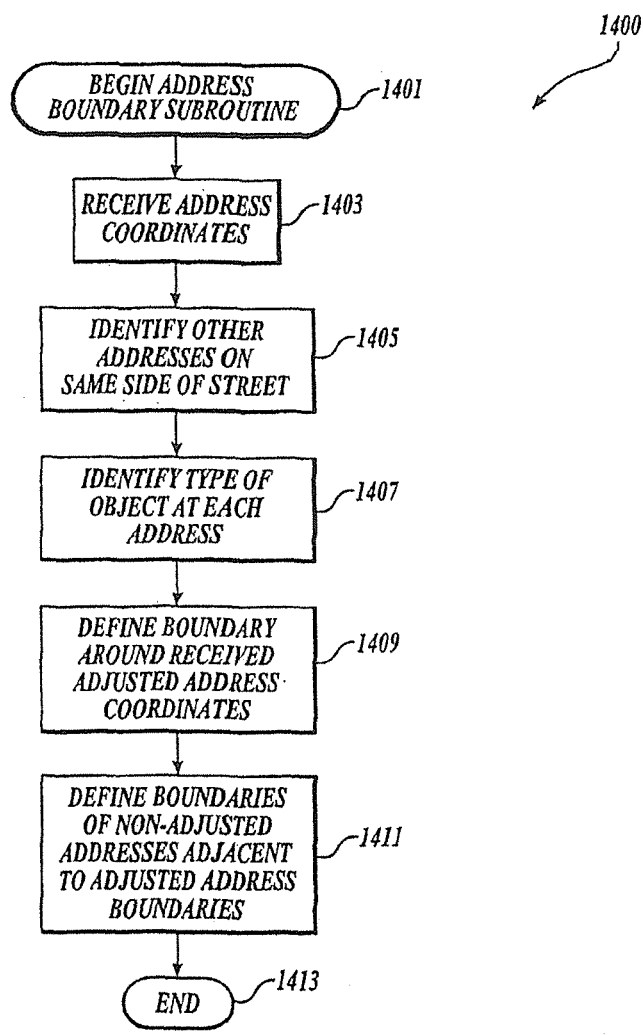
FIG. 14 is a flow diagram of an address boundary definition subroutine for defining address boundaries, in accordance with an embodiment of the present invention.

FIG. 14 is a flow diagram of an address boundary definition subroutine for defining address boundaries, in accordance with an embodiment of the present invention. The address boundary subroutine 1400 begins at block 1401. At block 1403, address coordinates for an address are received. As discussed above, address coordinates may be obtained from a listings database 67 or may be adjusted address coordinates generated as a result of the image correlation correction routine 1300 (FIG. 13). Upon receipt of address coordinates, at block 1405, addresses on the same side of the street as the received address are identified. At block 1407, the type of object at each address is identified. For example, as discussed above with respect to FIG. 5, it may be identified that one of the addresses is for a grocery store, another a shoe repair store, and another a convenience store.

At block 1409 it is determined which of the identified addresses are adjusted coordinate addresses, and for each adjusted coordinate address at block 1409, an image boundary is defined based on the type of object at the address. At block 1411, for the remaining addresses, i.e., the addresses that are not adjusted coordinate addresses, the image boundaries are defined adjacent to the defined address boundaries defined at block 1409. The image boundaries defined at block 1411 are defined and positioned based on the type of object located at the address and based on the boundaries defined in block 1409. For example, referring back to FIG. 5, if the addresses 505 and 511 are adjusted addresses, i.e., the coordinates for the addresses have been adjusted to coincide with the coordinates of user selected default representative images, the boundaries 507, 511 are defined with respect to the type of object and the address coordinates. Subsequently, the boundary for address 503 would be defined based on the type of object located at address 503 and based on the defined boundaries 507, 511. In particular, the boundary for address 503 would be defined such that it encompasses the area between boundaries 507 and 511, as it is highly likely that the images between boundaries 507 and 511 are representative of the address 509. Additionally, the boundary 509 may be defined such that it either overlaps the adjacent boundaries, as illustrated by overlap 513, or does not overlap adjacent boundaries. The address boundary subroutine 1400 completes at block 1413.

Figure 25:
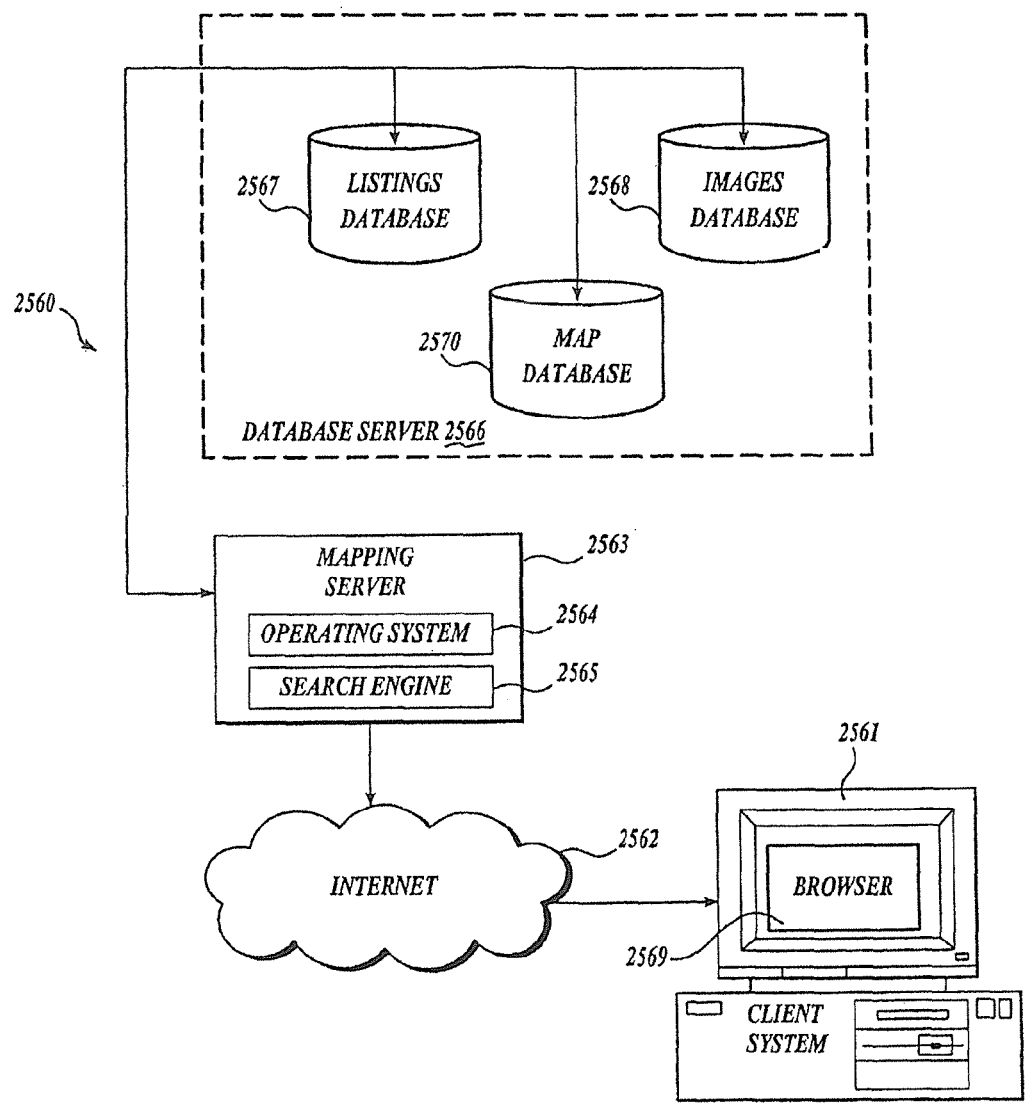
FIG. 25 is a block diagram showing an environment and arrangement of certain computing components for implementing an online mapping system according to one embodiment of the present invention.

In addition to generating online directories, address-correlated images, or images with geographic information associated therewith, as described above, embodiments of the present invention may also be used to generate map views of geographic areas. FIG. 25 illustrates one environment for implementing an online mapping interface that includes a mapping system 2560 and one or more client systems 2561 (only one is shown). In an illustrative embodiment, the client systems 2561 may include personal computers, hand-held computers, mobile telephones, PDAs, workstations, and the like, that individual users can use to communicate with the mapping system 2560. In the environment shown in FIG. 25, the client systems 2561 communicate with the mapping system 2560 via wired or wireless connections to one or more communication networks, such as the Internet 2562. Protocols and components for communicating via the Internet are well known to those of ordinary skill in the art of computer network communications. The client system 2561 requests and retrieves information from the mapping system 2560 via a Web browser application 2569 that provides the user with an interface to the Internet, as is also well known to those of ordinary skill in the art.

The mapping system 2560 depicted in FIG. 25 operates in a distributed computing environment comprising several computer systems that are interconnected via communication links, e.g., using one or more computer networks or direct connections. However, it will be appreciated by those of ordinary skill in the art that the system 2560 could equally operate in a computer system having fewer or greater number of components than are illustrated in FIG. 25. Thus, the description of the mapping system 2560 in FIG. 25 should be taken as exemplary and not limiting to the scope of the invention. In particular, the mapping system 2560 may comprise plural subsystems, each for performing a specific function in response to a request from a client system.

The mapping system 2560 as illustrated includes both a mapping server 2563 having an operating system 2564 and a search engine 2565, and a database server 2566 having a listings database 2567, an images database 2568, and optionally a map database 2570. The mapping server 2563, in this example, is a server that generates content corresponding to maps of geographic areas that can be displayed together with images correlated with specific locations included within the displayed map. In an illustrative embodiment, the mapping server 2563 communicates text and graphics organized as a Web page using, for example, hypertext transfer protocols. The mapping server 2563 also conducts searches of the listings databases 2567, images database 2568, and the map database 2570 in the database server 2566. The administration and overall operation of the mapping server 2563 is controlled by its operating system 2564, while its search function is performed by the search engine 2565 in cooperation with the database server 2566.

The database server 2566 maintains the listings database 2567 and the images database 2568 that the mapping server 2563 uses to respond to user requests and search queries. The listings database 2567 contains information generally found in conventional Yellow Pages in a searchable form, i.e., numerous listings (business names together with their addresses, phone numbers, business type, etc.) that are indexed and searchable by various search criteria. The listings database 2567 may also contain information such as the geographic coordinates of the business location, the business hours, a brief description or profile, customer reviews, etc., of each business listed. The images database 2568 contains digitized images of the businesses in correlation with the business addresses (i.e., street addresses) and/or geographic coordinates stored in the listings database 2567. The map database 2570 includes digitized maps of geographic regions that have corresponding images stored in the images database 2568. In an alternative embodiment, the map database 2570 may be omitted and street maps may be obtained from third party map providers, such as MapQuest®, and used with embodiments of the present invention.

The database server 2566 is configured to receive search queries from the search engine 2565 and return search results from the listings database 2567, the map database 2570, and the images database 2568. Those of ordinary skill in the art will recognize that the mapping server 2563 and the database server 2566 will each typically employ various computing components for storing and executing program instructions for operation of the servers.

The mapping system 2560 enables a user to search and view maps (e.g., street maps) of geographic locations in which some or all of the structures surrounding the streets on the map can be represented graphically using an image (e.g., business building) taken at the geographic location of the business that is correlated with the address of the geographic location. FIGS. 15-23 illustrate sample screen displays with graphical user interfaces that can be displayed on the client system 2561 in response to user requests and search queries, in accordance with embodiments of the present invention.

Figure 15:
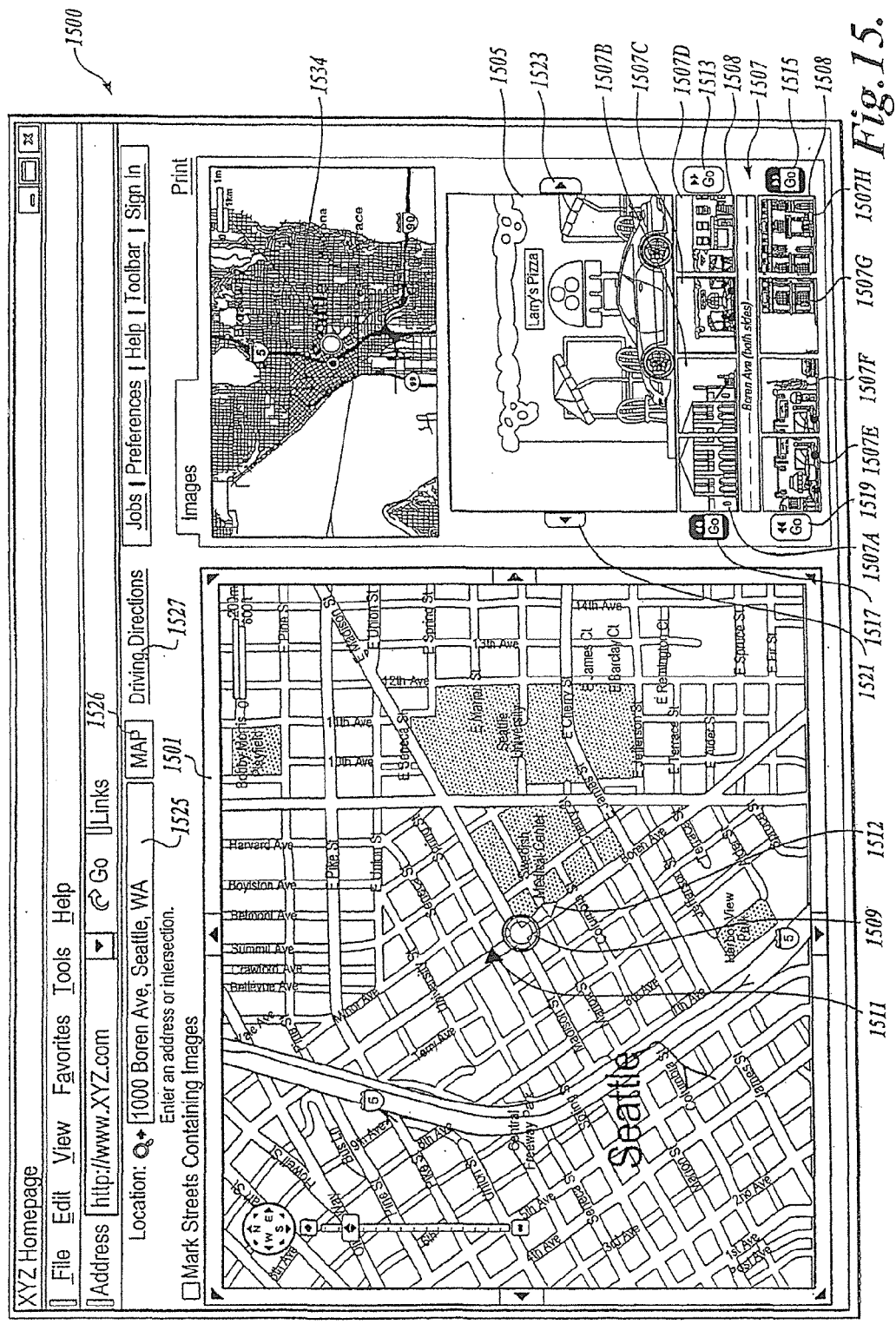
FIGS. 15-23 illustrate sample screen displays of map pages, that can be displayed on a client system in response to user requests, search queries, and interactions with the map page, in accordance with embodiments of the present invention.

FIG. 15 illustrates a map page 1500 returned to a client system 2561 when a user requests to view information on a location, in accordance with an embodiment of the present invention. In response to a user providing a location in the location box 1525 and selecting the map button 1526, the mapping system 2560 returns a street map 1501 centered on the location entered in the location box 1525. The entered location may be a general location, such as "Seattle, Wash.," or a specific location, such as "1000 Boren Ave., Seattle, Washington" The position of the specified location in the street map 1501 is identified by a position identifier 1509. The position identifier 1509 may be any type of graphical icon or image, including, but not limited to, a magnifying glass, a star, a car, etc. The position identifier 1509 may also be customizable or vary according to user preferences and/or detected environment.

The mapping system 2560 may also provide in the map page 1500 a representative image 1505 of the search location and secondary images 1507A-1507H surrounding the search location. As discussed below, the position identifier 1509, the representative image 1505, and the secondary images 1507A-1507H are interrelated and interaction with any one of the position identifier 1509, representative image 1505, or secondary images 1507A-1507H may result in a change to the others.

The position identifier 1509 may include scroll icons 1511, 1512 that may be selected by a user to move the position identifier 1509 in a particular direction along a street displayed on the street map 1501. The scroll icons 1511, 1512 are oriented around the position identifier so that they are parallel with the street on which the position identifier 1509 is located. For example, if the position identifier is positioned on a street that runs north and south, the scroll icons will point north and south, parallel with the direction of the street. Selection of the scroll icon that is pointing north will result in the position identifier moving in the northward direction along the street. The representative image 1505 and secondary images 1507A-1507H will automatically be adjusted to display a representative image and secondary images of the new location of the position identifier. The scroll icons 1511, 1512 may be displayed in accordance with a known or perceived path of motion. Additional scroll icons (not shown) may also be displayed if a user has additional directions of travel (e.g., if the specified location corresponds to an intersection).

In the example illustrated in FIG. 15, the images associated with the location "1000 Boren Ave., Seattle, Washington" include a representative image 1505 of that location and secondary images 1507A-1507H that are geographically near that location. If the searched for location is general in nature, such as "Seattle, Wash.," the associated images may be images at the center of the search location, or images commonly associated with the general location. For example, the representative image for the general location "Washington, D.C." may be an image of the White House. The secondary images may be identified as those images surrounding the location of the selected representative image. The representative image 1505 and secondary images 1507A-1507H for a specific location may be selected based on geographic coordinates or by identifying images that are correlated with the specific location.

The secondary images that are nearby or correlated with the searched for location may be presented in a single or dual filmstrip-type view 1508. The images within the dual filmstrip-type view 1508 may be further organized according to geographic location surrounding a street on which the search location is geographically positioned. For example, the search location "1000 Boren Ave., Seattle, Washington" has a representative image 1505 and a filmstrip-type view 1508 of secondary images 1507A, 1507B, 1507C, and 1507D that are on the same side of the street representation 1507 "Boren Ave" as the representative image 1505. As can be seen, the secondary image 1507C is also the representative image 1505. Secondary images 1507E, 1507F, 1507G, and 1507H are displayed in a filmstrip-type view 1508 on the opposite side of the street representation 1507. As will be appreciated, the dual filmstrip-type view may represent any collection of secondary images, and the dual filmstrip-type view of images geographically organized on opposite sides of a street is provided only as an example. For example, the dual filmstrip-type view of secondary images may represent only images on one side of the street, a montage of images surrounding the search location or representative of the search location, a panoramic view of the search location, a collection of images representative of historical markers near the search location, etc. Still further, a user may select the organization type for the dual filmstrip-type view of secondary images.

Also included in the map page 1500 are scroll icons 1513, 1515, 1517, 1519. Similar to interaction with the scroll icons 1511, 1512, interaction with any of the scroll icons 1513, 1515, 1517, 1519 results in the position identifier 1509, the interrelated representative image 1505, and the secondary images 1507A-1507H being adjusted. In an illustrative embodiment, the scroll icons 1513, 1515, 1517, 1519 can be directionally correlated with the orientation of the scroll icons 1511, 1512. For example, scroll icons 1515, 1517 can be directionally correlated to scroll icon 1511 such that interaction with one will result in the retrieval of new images in the direction of orientation of scroll icon 1511. In one embodiment, the scroll icons 1511, 1512, 1513, 1515, 1517, 1519 may be graphically distinguishable to identify various relationships among the icons and/or the degree to which the other displayed content will be manipulated. For example, scroll icons 1511, 1515, 1517 may be one color, in this example black, to identify their respective relationships and scroll icons 1512, 1513, 1519 may be a different color, in this example white, to illustrate their respective relationships. Interaction with one of the black scroll icons 1511, 1515, 1517 results in a change to the position identifier 1509, the representative image 1505, and the secondary images 1507A-1507H in the direction illustrated by the other black scroll icons. Likewise, interaction with one of the white scroll icons 1512, 1513, 1519 results in a change to the position identifier 1509, the representative image 1505, and the secondary images 1507A-1507H in the direction illustrated by the other white scroll icons. In another example, the scroll icons can have different sizes and/or ranges to graphically indicate how much adjustment will be made to the corresponding images and icons.

While the embodiment described herein utilizes black and white to graphically distinguish the scroll icons, any type of graphical representation may be used. For example, each set of related scroll icons may be displayed using hatching or different colors. Optionally, or in addition thereto, the related sets of scroll icons may each be displayed using different shapes.

Selection of either walk icon 1521 or walk icon 1523 results in a different image, such as the image geographically adjacent to the current representative image, being presented as the representative image 1505. In this example, if a user selects walk icon 1523, the corresponding image next to the current representative image 1505 (1507C), in this example secondary image 1507D, will be displayed as the representative image 1505. Additionally, if the current representative image is at the end of the filmstrip-type view, the filmstrip-type views 1508 of the secondary images will move in either direction and display a new set of secondary images, as if the user is walking down the street.

Figure 16:
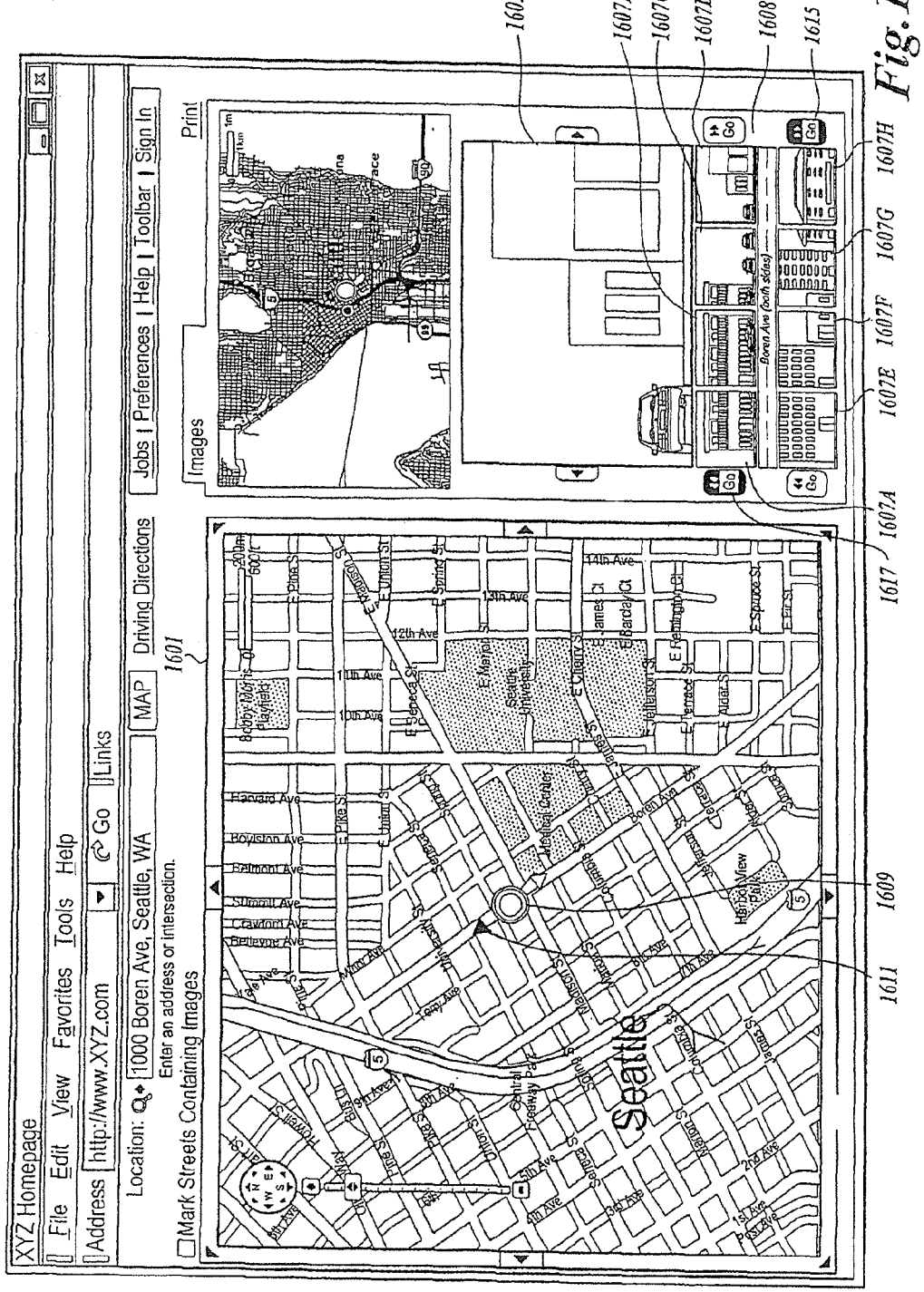

The scroll icons 1513, 1515, 1517, 1519 displayed at either end of the dual filmstrip-type views 1508 of the secondary images allow a user to view the next set of secondary images on either side of the street. If a user selects the black scroll icon 1517, a new set of secondary images, in this case four new images illustrated in FIG. 16, are displayed in the filmstrip-type view 1608 above the street representation 1607. Likewise, the set of secondary images on the other side of the street in the direction of the related black scroll icon 1615 will be adjusted such that the new set of secondary images appearing below the street representation 1607 are the secondary images 1607E-1607H directly across the street from the currently displayed secondary images 1607A-1607D above the street. The representative image 1605 is also adjusted to display a new representative image from the current set of secondary images 1607A-H. The position identifier 1609 is also moved in the direction of the related black scroll icon 1611 to identify the location on the street map 1601 of the currently displayed representative image 1605 and secondary images 1607A-1607H.

Figure 17:
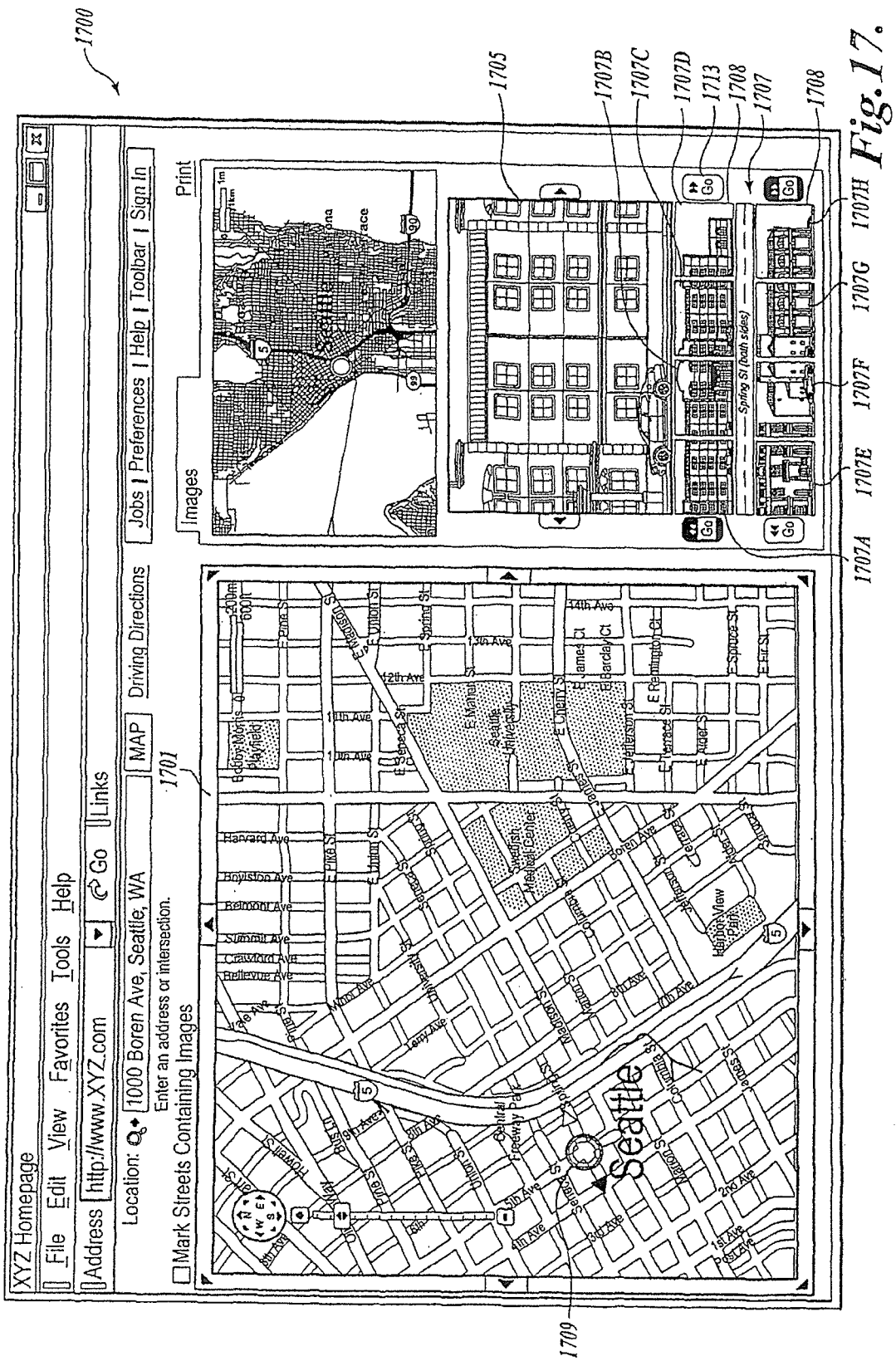

A user may also select the position identifier 1609 and reposition it to a new location within the street map 1601. In response, the mapping system 2560 will identify the images associated with the newly selected location on the street map 1601 and display those images as the representative image and correlated images. Referring to FIG. 17, In response to a user moving the position identifier 1709 to a new location within the street map 1701, the mapping system 2563 identifies a representative image 1705 correlated with the new location of the position identifier 1709 and secondary images 1707A-1707H surrounding the new location. Additionally, the street representation 1707 displayed between the two filmstrip-type views 1708 of the secondary images 1707A-1707H is updated to include the name of the street on which the position identifier 1709 is now located.

Figure 18:
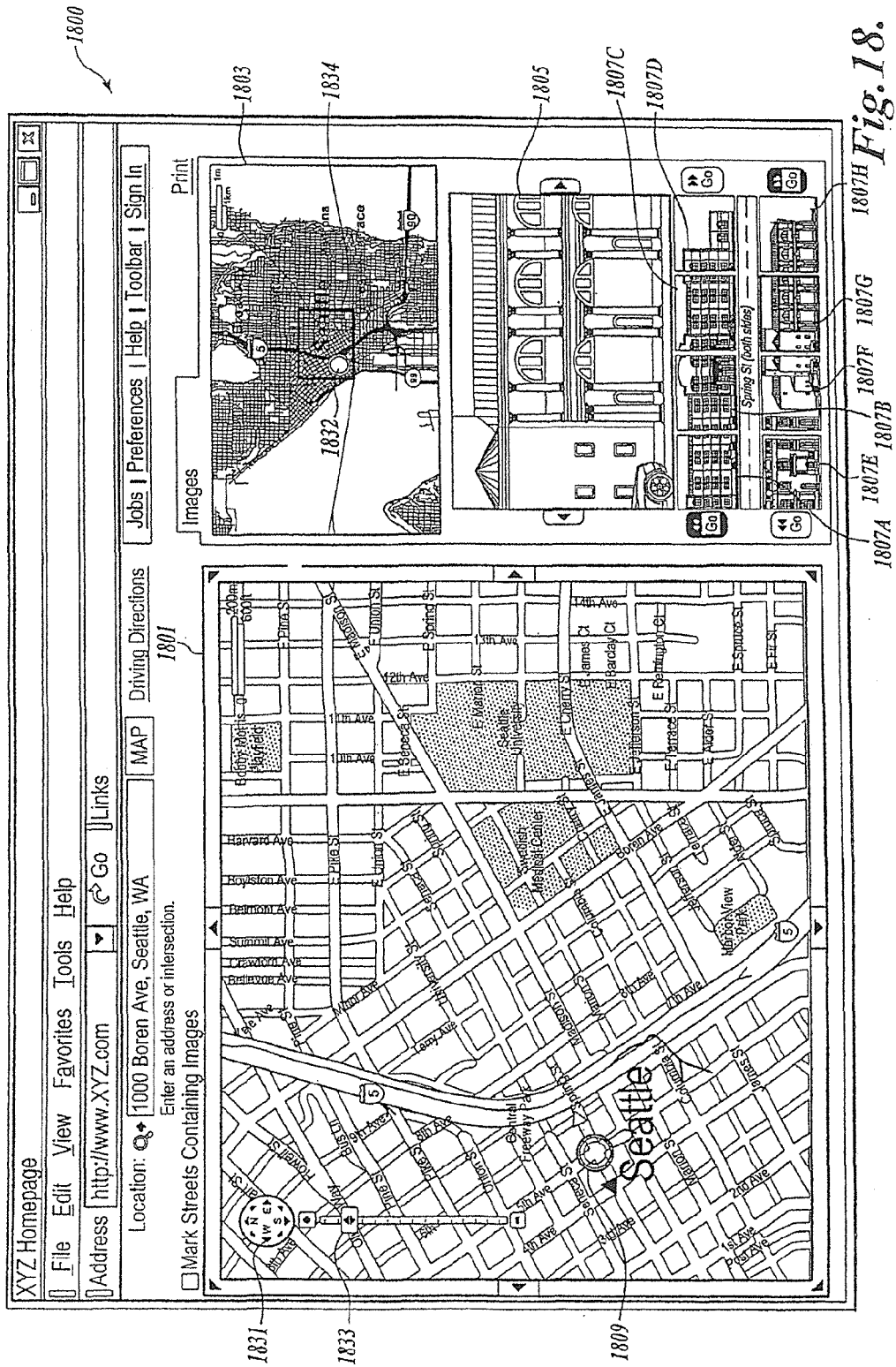

Through interaction with the map page 1700, a user may change the image that is presented as the representative image 1705 and change the correlated images 1707A-1707H. Similar to the secondary images displayed in the listing detail page 800 (FIG. 8) and discussed above, the secondary images 1707A-1707H may be interactive in that a user may position a pointing device, such as a mouse pointer, over one of the images and that image will temporarily replace the representative image 1705. Referring to FIG. 18, if a user manipulates a pointing device over secondary image 1807G (such as by hovering over the image), the representative image 1805 is replaced using the image 1807G as the new representative image. Additionally, a user may also select the representative image 1805 or one of the secondary images 1807A-1807H and be provided with a closer view (not shown) of the image selected. Alternatively, selection of a representative image 1805 or a secondary image 1807A-1807H may generate a listing details page 800 (FIG. 8) for the location associated with the selected image.

A user may also interact with the map page 1800 to adjust the zoom size or position of the street map 1801 through interaction with the sliding scale 1833 or the compass 1831. The sliding scale 1833 allows a user to adjust the amount of geographic area represented in the street map 1801. If the user moves the sliding scale 1833 up, the amount of geographic area represented in the street map 1801 decreases (i.e., the street map 1801 is zoomed-in). Likewise, if the user moves the sliding scale 1833 down, the amount of geographic area represented in the street map 1801 increases (i.e., the street map 1801 is zoomed-out). Interaction with the compass 1831 results in the street map 1801 scrolling to the next geographic area in the direction of the interaction with the compass 1831. For example, if a user selects the "West" arrow on the compass 1831, the street map 1801 will scroll to display the geographic area to the west of the currently displayed geographic area.

The map page 1800 may also include a map location window 1803 showing a zoomed-out view of the geographic area that the street map 1801 is displaying. In one example, the street map 1801 may be represented in the location map 1803 by a box 1834. Likewise, the position identifier 1809 may be reproduced in the location map 1803 and represented by a second position identifier 1832. A user may interact with the second position identifier 1832, or box 1834, in the location map 1803 to reposition the location for which images and the street map 1801 are provided. For example, a user may select the position identifier 1832 or box 1834 and reposition it to a different location on the location map 1803. In response, the street map 1801 is updated to display the new location in a location window 1803. Additionally, the mapping system 2560 locates the images correlated with the new location and displays the representative image 1807 and the secondary images 1807A-1807H in the map page 1800.

Figure 19:
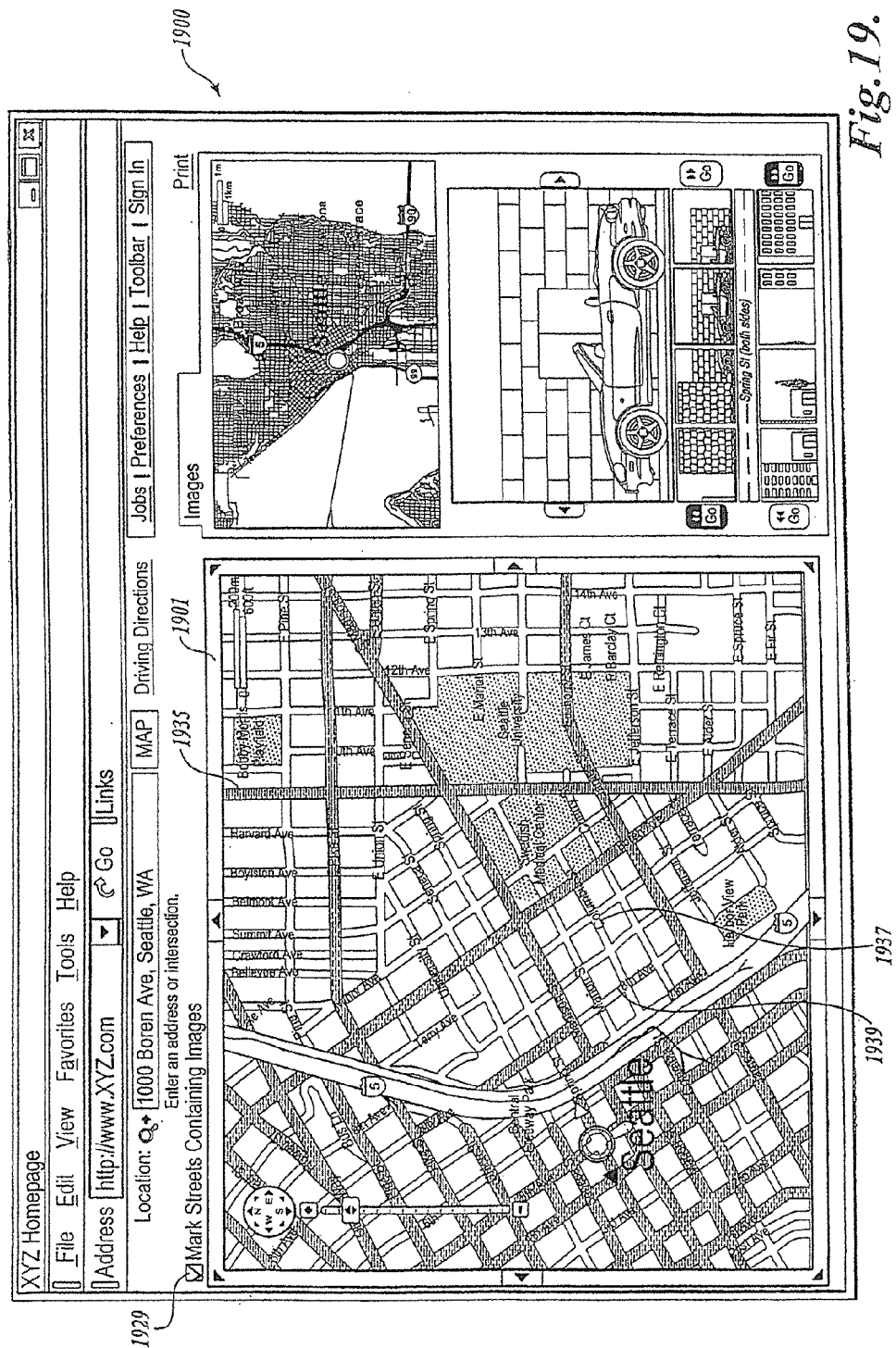

FIG. 19 is a map page 1900 identifying locations for which images have been captured, in accordance with an embodiment of the present invention. Through selection of the "Mark Streets Containing Images" 1929, the street map 1901 includes a graphical representation 1935 identifying which streets or locations have correlated images. For example, the streets covered with hatched lines 1935 illustrate streets with correlated images that are viewable by a user. In contrast, streets without hatched lines, such as "Columbia Street" 1937 and "8th Avenue" 1939, do not include correlated images. In one embodiment, if a user selects a street that does not include correlated images, such as "Columbia Street" 1937, no representative and/or secondary images will be displayed in the map page 1900. In an alternative embodiment, the mapping system 2560 may display the representative image and secondary images that are geographically closest to the selected location and provide an identifier (not shown) indicating that the selected location has no correlated images but those closest by are displayed. Still further, the mapping system 2560 may display a place holder identifying that the images are not available, or "coming soon."

Figure 20:
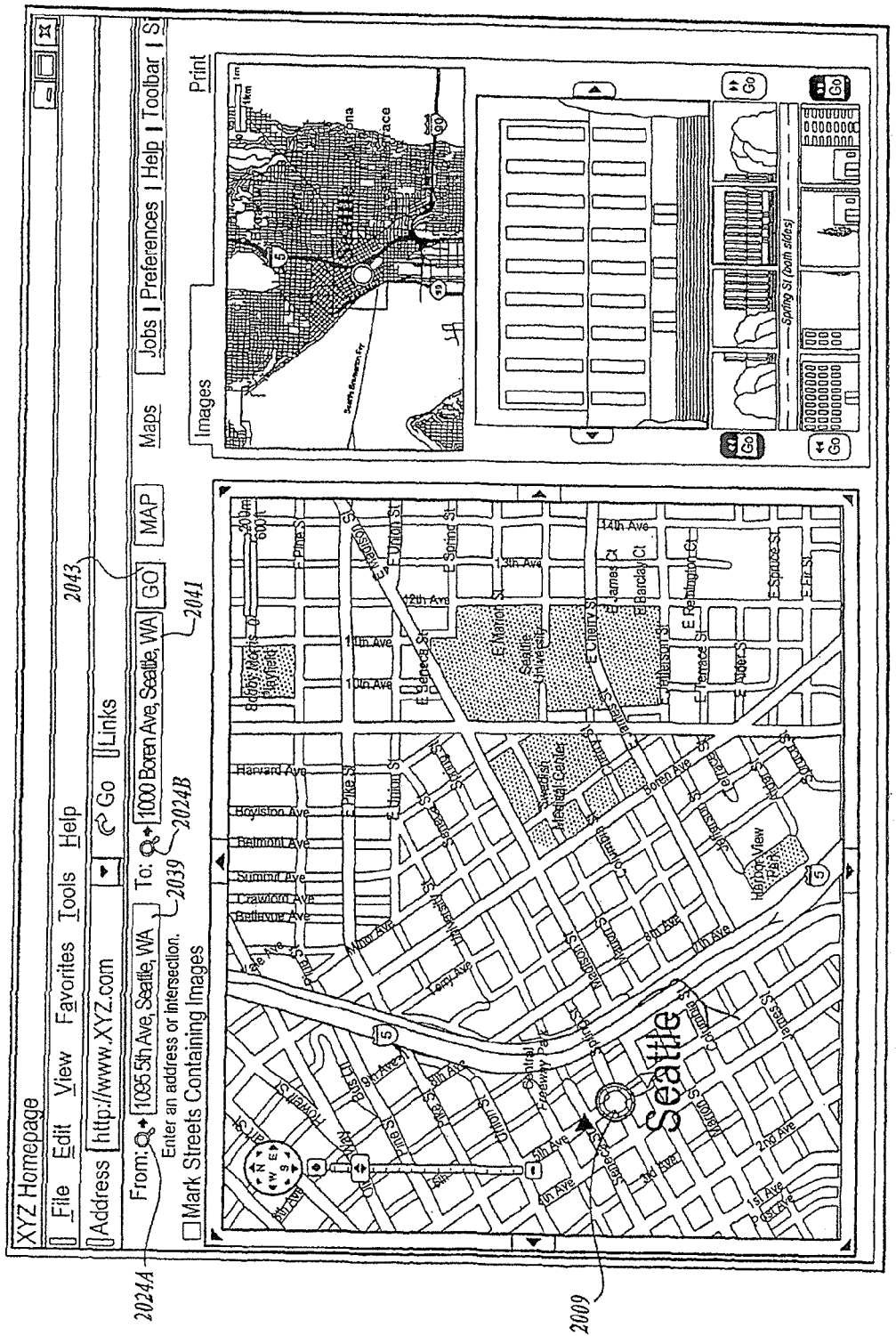

FIG. 20 illustrates a mapping page allowing a user to enter specific start and end locations for obtaining driving directions, in accordance with an embodiment of the present invention. To implement this feature, a user may select the "Driving Directions" link 1527 (FIG. 15) and be provided with "From" location box 2039 and "To" location box 2041. Using the "From" location box 2039 and "To" location box 2041, the user may input a starting location and/or an ending location and receive direction details between the two provided points. If the user has positioned the position identifier 2009 over the location from which they wish to travel, the user may select the From input icon 2024A and the specific address at the location of the position identifier 2009 will be included in the From box 2039. Similarly, if the user has placed the position identifier 2009 over the location to which they wish to travel, a user may select the To location icon 2024B and the mapping system 2560 will include the specific address at the location of the position identifier 2009 in the To box 2041. Upon selection of the GO icon 2043, direction details between the location in the From box 2039 and the location in the To box 2041 will be determined and provided to a user as illustrated in FIG. 21A.

Figure 21A:
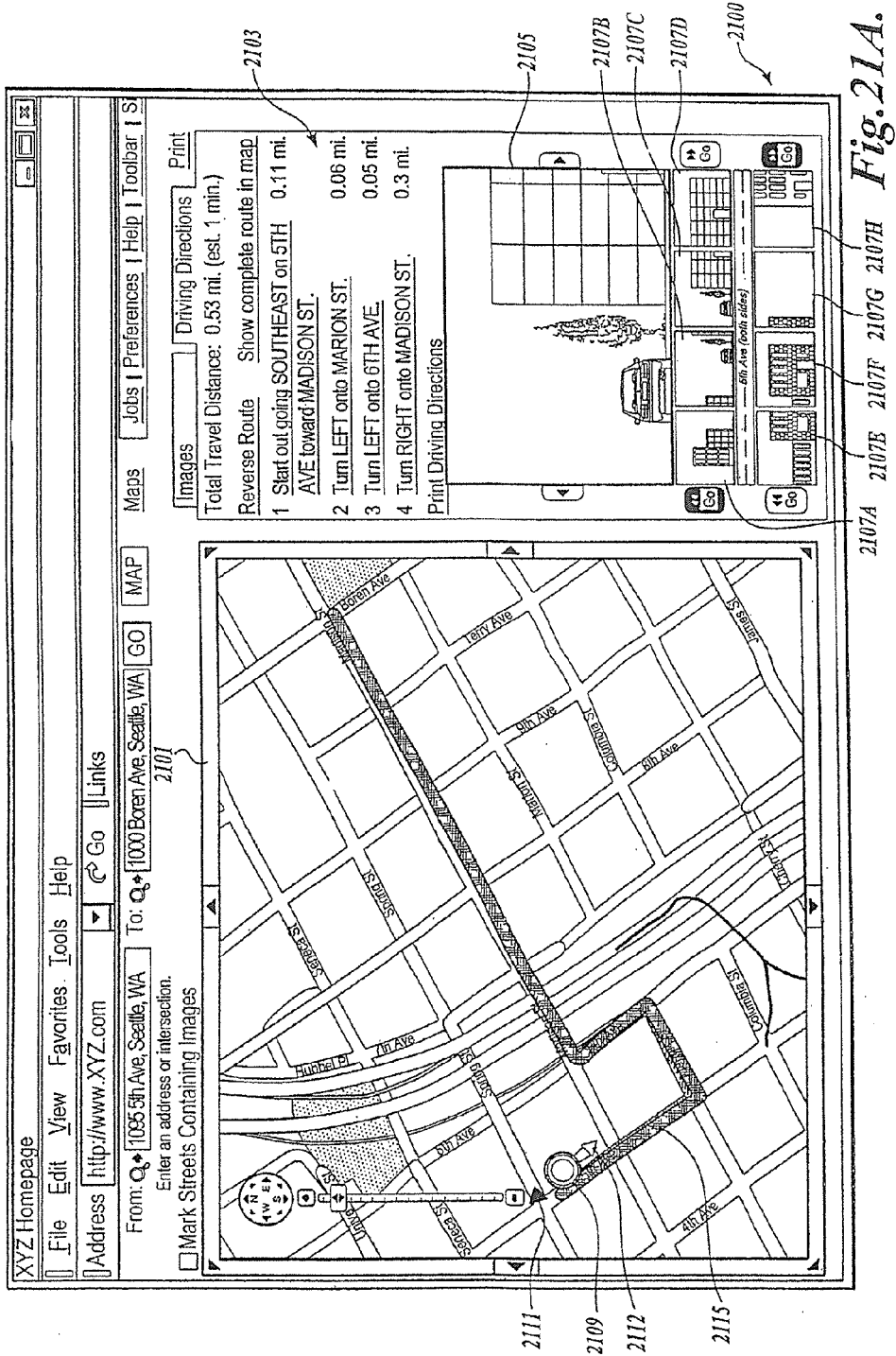

FIG. 21A illustrates a directions page 2100 including detailed mapping directions (direction details) between two locations, in accordance with an embodiment of the present invention. Continuing with the previous example, if the user selects to obtain driving directions between two locations, the mapping system 2560 will determine the specific directions between those two locations. Upon determining specific directions between the two locations, the street map 2101 is updated to provide a graphical representation 2115 illustrating the driving route between the two locations. In addition, direction details 2103 are provided identifying each of the turns and the distance that needs to be made to drive between the two locations.

In addition to receiving the direction details 2103 and the graphical representation of the route 2115 illustrating those direction details, the directions page 2100, similar to the map page discussed above, includes a position identifier 2109 with scroll icons 2111, 2112. As with above, a user may reposition the position identifier 2109 by selecting and moving the position identifier 2109 or selecting one of the scroll icons 2111, 2112. However, in one embodiment, the position identifier 2109 may be associated with the direction details 2103 such that a user may select one of the scroll icons 2111, 2112 and the position identifier will move along the route 2115 of the direction details. The representative image 2105 and secondary images 2107A-2107H associated with the location of the position identifier 2109 may also be displayed. Similar to the discussion above, the scroll icons 2111, 2112 of the position identifier 2109 are oriented such that they are parallel with the street on which the position identifier is located. Thus, if the user selects the white scroll icon 2112, the position identifier 2109 will move in the direction of that icon along the route 2115. The representative image 2105 and secondary images 2107A-2107H for the new location will be provided. If the position identifier reaches a turn in the route, the scroll icons 2111, 2112 will reorient to be parallel with the street following the turn that is included in the direction details 2103.

Figure 21B:
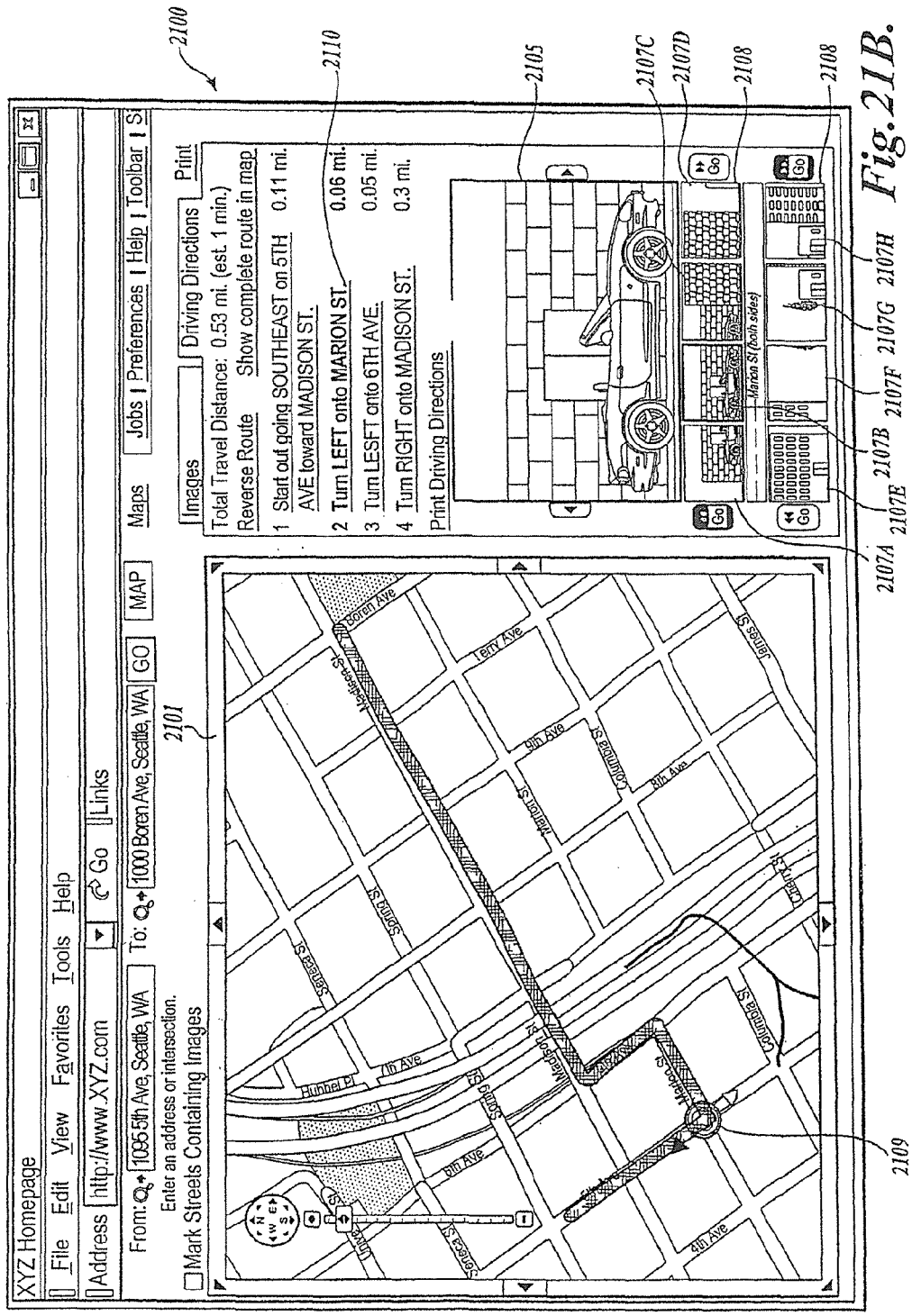

Additionally, each of the direction details 2103 may be user selectable. In response to a selection of a direction detail 2103, the position identifier 2109 will be repositioned to the selected location and a representative image and secondary images of that location will be provided to the user, as illustrated in FIG. 21B. If there are no images correlated with the location of the direction detail, a place holder may be displayed. For example, if the direction detail is a turn, the place holder may be an icon indicating that the direction detail is a turn. Additionally, the place holder may indicate the direction of the turn and/or the degree of the turn (hard right, slight right, etc.). Alternatively, if there are no correlated images for the location of the direction detail, the system may provide an available image along the route that is closest to the location of the direction detail and optionally indicate that this image is "nearby" the direction detail.

FIG. 21B illustrates a directions page 2100 identifying a representative image 2105 and secondary images 2107A-2107H associated with a particular portion of the driving directions, in accordance with an embodiment of the present invention. Continuing with the above example, if a user selects the specific driving direction of "Turn LEFT onto MARION ST." 2110, the position identifier 2109 is repositioned to that location on the street map 2101. A representative image 2105 of that location is displayed to the user along with dual filmstrip-type 2108 views of secondary images correlated with or geographically near that location.

Figure 22:
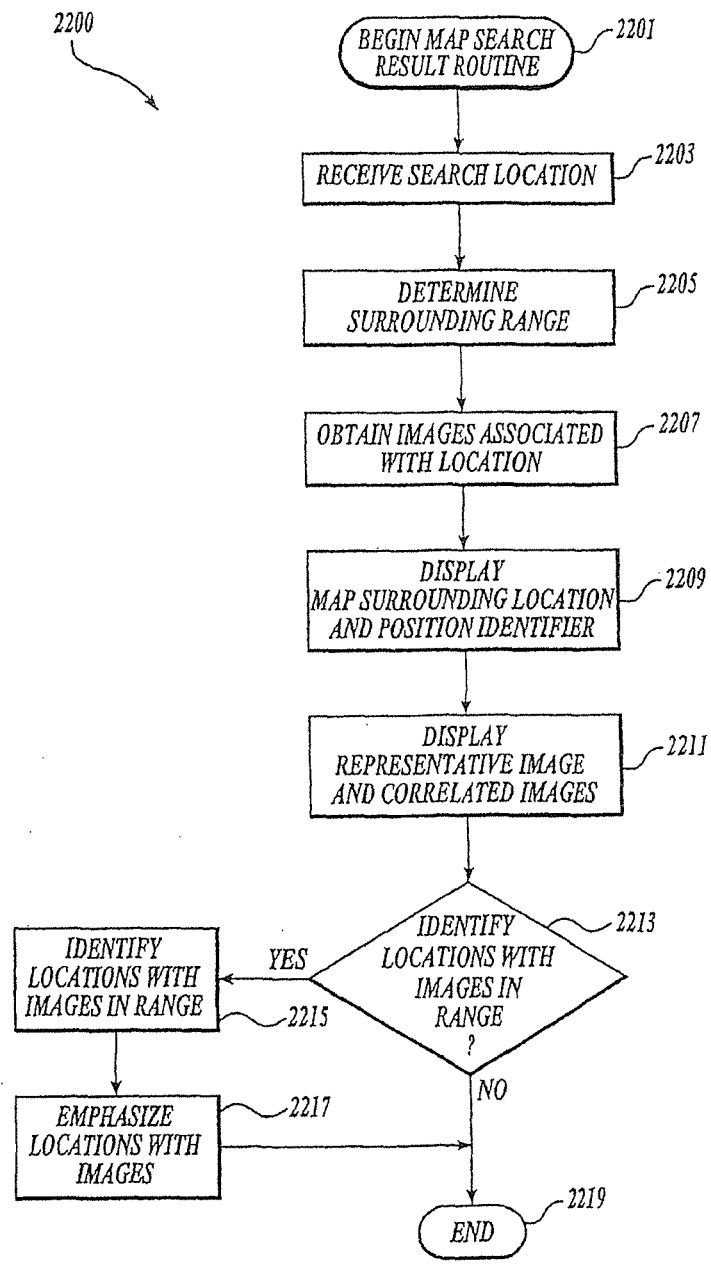

FIG. 22 is a flow diagram of a map search results routine for providing a map view of a search location, in accordance with an embodiment of the present invention. The map search result routine 2200 begins at block 2201 and at block 2203 a search location is received. As discussed above, a user may provide a specific search location or select a location on a map. Additionally, if a user is viewing a listing detail page (FIG. 8), a user may select to map the area represented in the listing detail page 800. Upon receipt of a search location, at block 2205, a range surrounding the location is determined. Determination of a surrounding range may be accomplished using a variety of techniques. For example, if the search location is in a densely populated area, the surrounding range may be small (e.g., two miles), as there are likely several images for that area. In contrast, if the search location is in a rural area, the surrounding range may be much larger to include additional images.

Upon determination of a surrounding range at block 2205, at block 2207, images associated with the search location are determined and obtained from the image database. At block 2209, a map, such as a street map, surrounding the search location is displayed to a user in a map page and a position identifier is represented on the displayed map to identify the search location. Additionally, a representative image associated with the search location is displayed and the secondary images surrounding and/or correlated with the search location are displayed to the user. As discussed above, the correlated images may be displayed in a dual filmstrip-type view illustrating images on either side of a street of the search location, images on the same side of the street as the search location, a montage of images representative of the search location (or the surrounding area), a panoramic view of the area surrounding the search location, etc.

At decision block 2213, a determination is made as to whether locations within the determined range that have correlated images are to be identified to the user. If it is determined at decision block 2213 that locations within the determined range that have correlated images are to be identified to a user, at block 2215, the locations within the determined range are identified. At block 2217, the locations with correlated images are represented on the street map by emphasizing the street corresponding to those locations. For example, referring back to FIG. 19, streets containing locations with correlated images may be emphasized by providing a hatching over those streets. However, if it is determined at decision block 2213 that locations within the range that have correlated images are not to be identified to the user, or after emphasizing those locations at block 2217, the map search result routine 2200 completes, as illustrated by block 2219.

Figure 23:
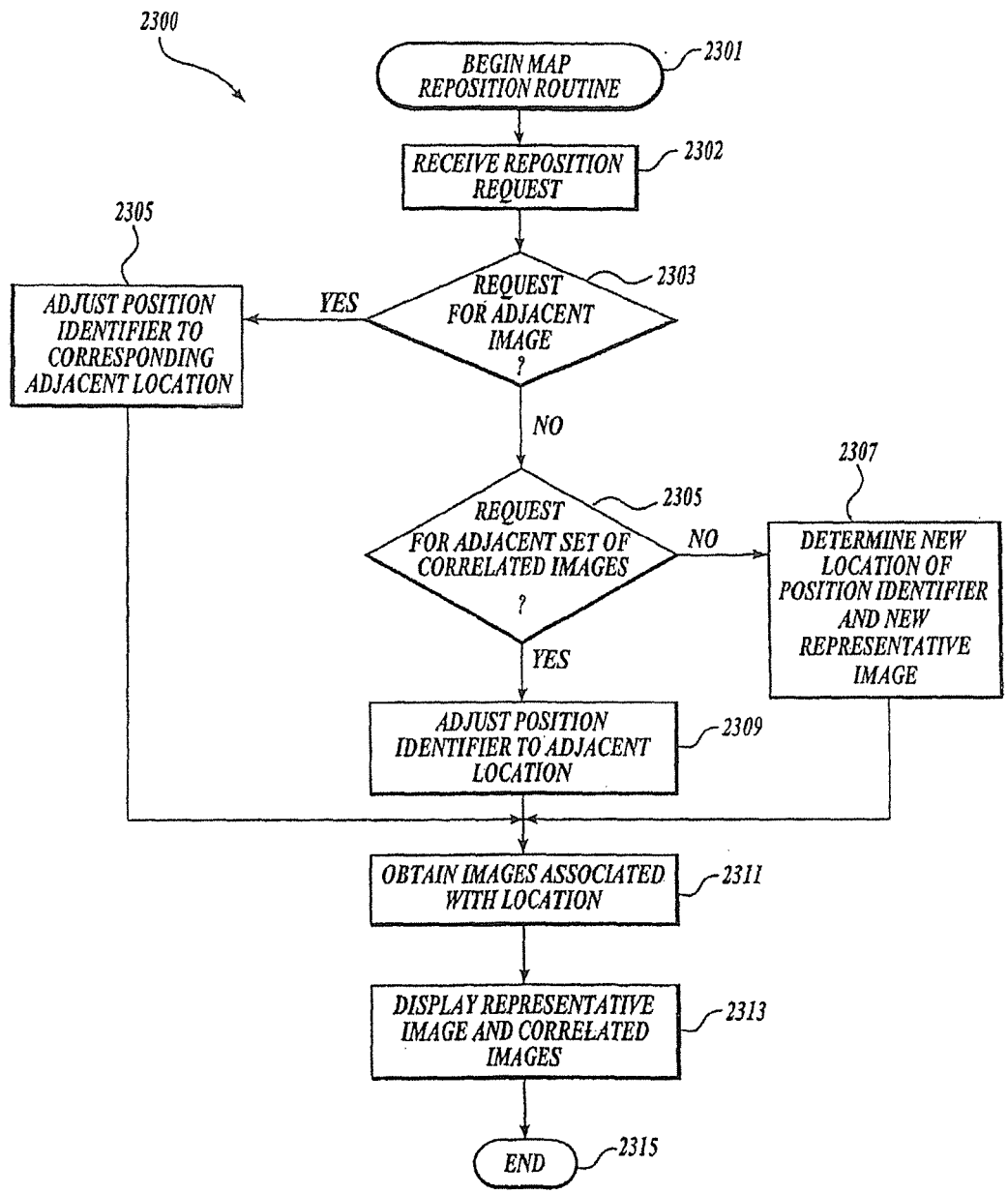

FIG. 23 is a map reposition routine for repositioning a position identifier and adjusting the displayed representative and correlated images, in accordance with an embodiment of the present invention. The map reposition routine 2300 begins at block 2301 and at block 2302 a reposition request is received. At decision block 2303, a determination is made as to whether the reposition request is for an adjacent image. As discussed above, a request for an adjacent image may result from a user selecting a walk icon. If it is determined at decision block 2303 that the reposition request is a request for an adjacent image, at block 2305, the position identifier is adjusted on the street map to the location of the selected adjacent image and a new representative image is displayed.

However, if it is determined at decision block 2303 that the request is not for an adjacent image, a determination is made at decision block 2305 as to whether the reposition request is a request for an adjacent set of correlated images. As discussed above, an adjacent set of correlated images may be requested by a user selecting one of the scroll icons located near the secondary images, or by interacting with either of the scroll icons of the position identifier displayed on a street map. If it is determined at decision block 2305 that the request is not for an adjacent set of images, at block 2307, the new location of the position identifier is determined. As discussed above, if a user repositions the position identifier to a new location, a new representative image and set of secondary images associated with the new location will be provided to the user.

If it was determined at decision block 2305 that the reposition request was a request for an adjacent set of correlated images, at block 2309, the position identifier displayed on the street map is repositioned at a location corresponding to the next set of adjacent images. At block 2311, the images associated with the location are obtained. At block 2313, the representative image is determined and displayed to a user and the secondary images surrounding that representative image are also displayed to the user. The map reposition routine 2300 completes at block 2315.

Figure 24:
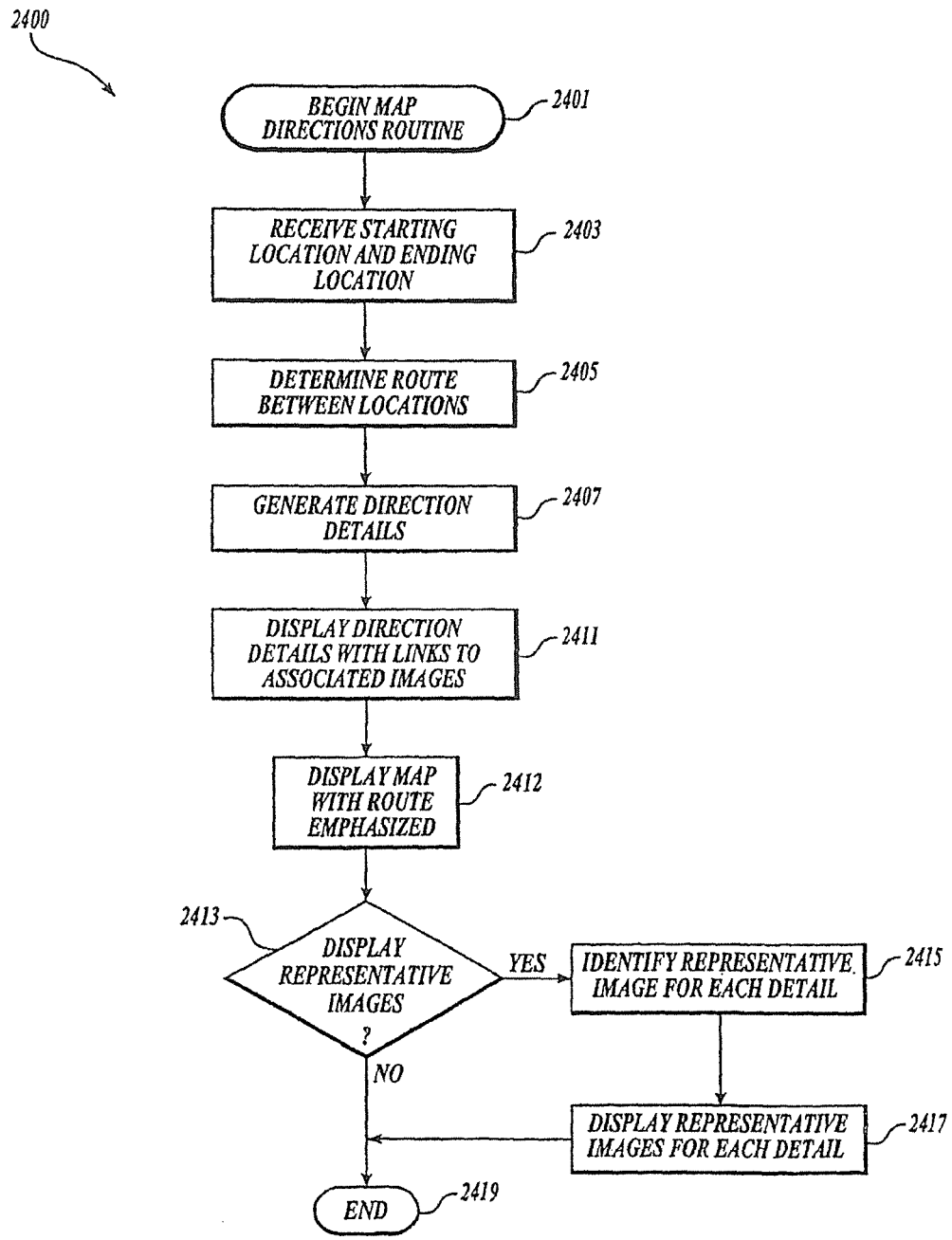
FIG. 24 is a flow diagram of a map directions routine for displaying directions between two locations along with representative images between those two locations, in accordance with an embodiment of the present invention.

FIG. 24 is a flow diagram of a map directions routine for displaying directions between two locations along with representative images between those two locations, in accordance with an embodiment of the present invention. The map directions routine 2400 begins at block 2401. At block 2403, a starting location and an ending location are received. As discussed above, a user may input the starting and ending locations or select those locations from a street map view by interacting with the position identifier. Upon receiving a starting location and ending location at block 2403, at block 2405, a route between those two locations is determined. As will be appreciated by one of skill in the relevant art, there are many techniques for determining routes between two locations. For example, the shortest physical driving route between two locations may be determined, the route with the shortest calculated time based on driving speeds for streets between those two locations may be determined, a route with the least amount of traffic may be determined, etc. Any technique for determining a route between two locations may be used with embodiments of the present invention.

Upon determination of a route between two locations, a set of direction details is generated at block 2407. The direction details may include, but are not limited to, names of streets, direction of turns, driving length on each street, and total drive time. At block 2411, the direction details are displayed to the user identifying the route between the two locations. Additionally, on the street map, the streets that are to be driven may be emphasized using a bold, hatched, or any other type of graphical emphasis to display the route that is to be taken between the two locations. At block 2412, the map with the route emphasized is displayed to the user.

At decision block 2413, a determination is made as to whether images corresponding to one of the direction details, or along the route, are to be displayed. A representative image and secondary images may be displayed in response to a user selecting one of the driving direction details, interacting with the position identifier, or interacting with one of the scroll icons. If it is determined at decision block 2413 that a representative image and secondary images are to be displayed, at block 2415 a representative image and the secondary images for the selected driving direction detail, or location along the route, are identified. At block 2417 the identified representative image and the secondary images are displayed. In an embodiment, a representative image corresponding to each direction detail may be displayed next to the direction detail as a thumbnail image. The displayed representative image and the direction detail may be interactive and selection of either will provide a user with a larger view of the representative image and the secondary images.

If it is determined at decision block 2413 that a representative image and secondary images are not to be displayed, or after a representative image and secondary images have been displayed, at block 2419 the map directions routine 2400 completes.

While various embodiments of the invention have been illustrated and described, it will be appreciated that changes can be made therein without departing from the spirit and scope of the invention. The scope of the invention should be determined from the following claims and equivalents thereto.

What is claimed is:

1. A computing system, comprising:
   a processor; and
   a memory device including instructions that, when executed by the processor, cause the computing system to:
      receive a search request from a computing device to display a location of a point of interest, the point of interest associated with a geographic location;
      receive location coordinates associated with a current geographic location of the computing device;
      provide for display a map, the map including a viewable area that includes an icon displayed at the current geographic location of the computing device and a graphical representation of the point of interest, the map orientated with respect to a reference axis;
      receive a selection of an orientation element to cause the icon to include a visual representation of a direction of orientation of the computing device with respect to the reference axis; and
      orient the viewable area of the map to substantially match the direction of orientation of the computing device.

2. The computing system of claim 1, wherein the reference axis is aligned with respect to magnetic North.

3. The computing system of claim 2, wherein the viewable area of the map is updated based at least in part on the direction of orientation of the computing device with respect to magnetic North.

4. The computing system of claim 1, wherein the visual representation of the direction of orientation includes a graphical element that points in substantially a same direction as the computing device.

5. The computing system of claim 1, wherein the instructions when executed further cause the computing system to:
   display a graphical element on the display indicating the direction of orientation of the computing device with respect to the reference axis.

6. The computing system of claim 1, wherein the map includes a graphical element that displays a direction corresponding to an orientation of the device with respect to magnetic North.

7. The computing system of claim 1, wherein the instructions when executed further cause the computing system to:
   determine a plurality of geographically adjacent images corresponding to the geographic location; and
   generate a three-hundred and sixty degree view of a region surrounding the geographic location using at least a portion of the plurality of geographically adjacent images.

8. The computing system of claim 7, wherein the instructions when executed further cause the computing system to:
   receive a selection of at least one interactive element; and
   provide a map including a translatable icon representative of a current geographic location being viewed, the translatable icon being configured to move on the map to correspond to a location of the plurality of geographically adjacent images.

9. The computing system of claim 7, wherein the instructions when executed further cause the computing system to:
   receive selection of one of a first icon or a second icon, the first icon being configured to zoom in on a display of the three-hundred and sixty degree view of the region surrounding the geographic location and the second icon being configured to zoom out on the display of the three-hundred and sixty degree view of the region surrounding the geographic location.

10. The computing system of claim 7, wherein the instructions when executed to generate the three-hundred and sixty degree view further cause the computing system to:
    stitch together the plurality of geographically adjacent images to provide a view of the region surrounding the geographic location.

11. The computing system of claim 7, wherein each of the plurality of geographically adjacent images includes a view of at least a portion of the region surrounding the geographic location.

12. The computing system of claim 7, wherein the instructions when executed further cause the computing system to:
    cause to be displayed proximate to the plurality of geographically adjacent images, a first movement icon and a second movement icon, wherein the first movement icon and the second movement icon are oriented in a direction approximating a direction of movement; and
    receive an interaction with one of the first movement icon or the second movement icon to view adjacent images of the plurality of geographically adjacent images within the region surrounding the geographic location using.

13. A computer-implemented method, comprising:
- receiving a search request from a computing device to display a location of a point of interest, the point of interest associated with a geographic location;
- receiving location coordinates associated with a current geographic location of the computing device;
- providing for display a map, the map including a viewable area that includes an icon displayed at the current geographic location of the computing device and a graphical representation of the point of interest, the map orientated with respect to a reference axis;
- receiving a selection of an orientation element to cause the icon to include a visual representation of a direction of orientation of the computing device with respect to the reference axis; and
- orienting the viewable area of the map to substantially match the direction of orientation of the computing device.

14. The computer-implement method of claim 13, further comprising:
- determining a plurality of geographically adjacent images corresponding to the geographic location; and
- generating a three-hundred and sixty degree view of a region surrounding the geographic location using at least a portion of the plurality of geographically adjacent images.

15. The computer-implement method of claim 14, wherein generating the three-hundred and sixty degree view includes:
- stitching together at least a portion of the plurality of geographically adjacent images to provide a three-hundred and sixty degree view of a region surrounding the geographic location, wherein the region being centered proximate the geographic location.

16. The computer-implemented method of claim 15, further comprising:
- receiving selection of one of a first icon or a second icon, the first icon being configured to zoom in on a display of the three-hundred and sixty degree view of the region surrounding the geographic location and the second icon being configured to zoom out on the display of the three-hundred and sixty degree view of the region surrounding the geographic location.

17. A non-transitory computer readable storage medium storing one or more sequences of instructions executable by one or more processors to perform a set of operations comprising:
- receiving a search request from a computing device to display a location of a point of interest, the point of interest associated with a geographic location;
- receiving location coordinates associated with a current geographic location of the computing device;
- providing for display a map, the map including a viewable area that includes an icon displayed at the current geographic location of the computing device and a graphical representation of the point of interest, the map orientated with respect to a reference axis;
- receiving a selection of an orientation element to cause the icon to include a visual representation of a direction of orientation of the computing device with respect to the reference axis; and
- orienting the viewable area of the map to substantially match the direction of orientation of the computing device.

18. The non-transitory computer readable storage medium of claim 17, further comprising instructions executed by the one or more processors to perform the set of operations of:
- determining a plurality of geographically adjacent images corresponding to the geographic location; and
- generating a three-hundred and sixty degree view of a region surrounding the geographic location using at least a portion of the plurality of geographically adjacent images.

19. The non-transitory computer readable storage medium of claim 18, further comprising instructions executed by the one or more processors to perform the set of operations of:
- stitching together at least a portion of the plurality of geographically adjacent images to provide a three-hundred and sixty degree view of a region surrounding the geographic location, wherein the region being centered proximate the geographic location.

20. The non-transitory computer readable storage medium of claim 17, further comprising instructions executed by the one or more processors to perform the set of operations of:
- providing information relating to the geographic location to at least one algorithm configured to determine content relating to the geographic location; and
- causing to be displayed the content.

* * * * *